(12) United States Patent
Kodama et al.

(10) Patent No.: US 6,570,041 B1
(45) Date of Patent: May 27, 2003

(54) POLYOXYTETRAMETHYLENE GLYCOL AND PROCESS FOR PRODUCING THE SAME

(75) Inventors: Tamotsu Kodama, Kurashiki (JP); Takeshi Mori, Moriyama (JP); Takaharu Akedo, Ootsu (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/031,614

(22) PCT Filed: Aug. 18, 2000

(86) PCT No.: PCT/JP00/05562

§ 371 (c)(1), (2), (4) Date: Jan. 22, 2002

(87) PCT Pub. No.: WO01/14455

PCT Pub. Date: Mar. 1, 2001

(30) Foreign Application Priority Data

Aug. 19, 1999 (JP) .................................... 11-233011

(51) Int. Cl.$^7$ ........................ C07C 43/11; C07C 43/18; C07C 43/20
(52) U.S. Cl. ...................... 568/617; 568/616; 568/613; 568/619
(58) Field of Search ............................... 568/617, 613, 568/616, 619, 606, 866, 867

(56) References Cited

U.S. PATENT DOCUMENTS

| 4,568,775 A | 2/1986 | Aoshima et al. |
|---|---|---|
| 4,677,231 A | 6/1987 | Aoshima et al. |
| 5,097,077 A | 3/1992 | Mueller et al. |
| 5,099,074 A | 3/1992 | Mueller et al. |
| 5,416,240 A | 5/1995 | Weyer et al. ................ 568/617 |
| 5,741,888 A | 4/1998 | Weyer et al. |

FOREIGN PATENT DOCUMENTS

| JP | 2525155 | 5/1996 |
|---|---|---|
| JP | 10025340 | 1/1998 |
| WO | WO 99/61507 | 2/1999 |

OTHER PUBLICATIONS

International Search Report, mailed Sep. 26, 2000, in International Application No. PCT/JP00/05562.

Supplementary European Search Report, EP 00 95 3515, Sep. 17, 2002, Annex to the European Search Report, 2 pp.

*Primary Examiner*—Johann Richter
*Assistant Examiner*—Elvis O. Price
(74) *Attorney, Agent, or Firm*—Finnegan, Henderson, Farabow, Garrett, & Dunner, L.L.P.

(57) ABSTRACT

Disclosed is a high heat resistance and low viscosity polyoxytetramethylene glycol (PTMG) having the following characteristics (1) to (4): (1) a number average molecular weight of from 500 to 3000; (2) a molecular weight distribution of 1.8 or less in terms of the Mw/Mn ratio; (3) a content of high molecular weight PTMG molecules of from 2 to 5% by weight, wherein the high molecular weight PTMG molecules are PTMG molecules having molecular weights which are at least six times as large as the number average molecular weight of all PTMG molecules; and (4) a heteropolyacid content of from 10 to 900 ppb by weight.

5 Claims, 2 Drawing Sheets

POLYOXYTETRAMETHYLENE GLYCOL AND PROCESS FOR PRODUCING THE SAME

This application is a 371 of PCT/JP00/05562, filed Aug. 18, 2000.

BACKGROUND OF THE INVENTION

1. Field of the Invention

The present invention relates to a polyoxytetramethylene glycol (hereinafter, simply referred to as "PTMG") and a method for producing the same. More particularly, the present invention is concerned with a PTMG having not only a limited content of from 2 to 5% by weight with respect to high molecular weight PTMG molecules, wherein the high molecular weight PTMG molecules are defined as PTMG molecules having molecular weights which are at least six times as large as the number average molecular weight of all PTMG molecules, but also a very limited heteropolyacid content of from 10 to 900 ppb by weight. The present invention is also concerned with a method for producing such PTMG. The PTMG of the present invention exhibits improved properties with respect to heat resistance and low viscosity. By virtue of these improved properties, the PTMG of the present invention can be advantageously used as a raw material for a polyester elastic fiber, a polyurethane elastic fiber and the like.

2. Prior Art

PTMG is used as a raw material for, for example, a polyester elastic fiber and a polyurethane elastic fiber.

As described in Japanese Patent No. 2,525,155, in general, polyether type polymers, such as PTMG, are likely to suffer deterioration by oxidation, UV rays and heat. Thus, although PTMG exhibits excellent properties as raw materials for resins and lubricants, deterioration of such a polymer has been a problem. For example, a part of PTMG is decomposed by heat applied to the polymerization reaction or by heat generated during the polymerization reaction, and the resultant polymer product suffers discoloration and lowering of the elastic properties (such as strength and elongation), which are caused by the heat decomposition (heat deterioration) of a part of the PTMG. Therefore, there is a demand for a PTMG having excellent heat resistance.

Various stabilizers for PTMG are known in the art, but most of the stabilizers are antioxidants. In addition, it is noted that conventional stabilizers for preventing heat deterioration are unsatisfactory. Specifically, an aromatic stabilizer (Japanese Patent No. 2,525,155) is frequently used for preventing heat deterioration, but it is likely to cause discoloration of an ultimate product and it may also cause environmental pollution.

In addition, since the viscosity of PTMG is relatively high, heating of the polymerization system is necessary for producing PTMG by an economically and commercially advantageous polymerization method which employs no solvent or only a small amount of solvent. When a PTMG is produced in the absence of a solvent, heat deterioration of produced PTMG becomes a problem. Accordingly, there is a demand for PTMG having both the improved properties with respect to both heat resistance and low viscosity.

Further, the addition of the above-mentioned stabilizer has a danger of causing discoloration and lowering of the elastic properties (such as strength and elongation) of the polymer product. Therefore, there has been a strong demand for a method of producing PTMG having improved heat resistance, wherein the amount of additives, such as a stabilizer, is suppressed to a level as low as possible.

Further, PTMG having high viscosity has the following problems. When PTMG is used in a polymerization thereof with other compounds in the absence of a solvent, it becomes necessary to employ high polymerization temperatures. Even when the PTMG employed has a high heat resistance, the advantages of its high heat resistance properties are not utilized in such a polymerization as needs high temperatures.

SUMMARY OF THE INVENTION

In this situation, the present inventors have made extensive and intensive studies with a view toward developing a PTMG having improved properties with respect to both heat resistance and low viscosity. As a result, it has unexpectedly been found that, when the PTMG has not only a molecular weight distribution as narrow as 1.8 or less so that the viscosity of the PTMG becomes low, but also a content of high molecular weight PTMG molecules within a specific range (2 to 5% by weight), wherein the high molecular weight PTMG molecules are defined as being PTMG molecules having molecular weights which are at least six times as large as the number average molecular weight of all PTMG molecules, the crystalline, high molecular weight PTMG molecules contained in the PTMG do not suffer phase separation but interact with the low molecular weight PTMG molecules which are likely to suffer heat decomposition, thereby suppressing the heat decomposition of the PTMG. Such a PTMG, notwithstanding a low viscosity thereof, has high heat resistance. Further, it has unexpectedly been found that, when the PTMG contains a heteropolyacid (which is a residue of the polymerization heteropolyacid catalyst (for PTMG)) in a very small amount within a specific range, a plurality of acid groups of the heteropolyacid molecule interact with hydroxyl groups of a plurality of PTMG molecules to thereby form crosslinking sites, so that the heat resistance of the PTMG is further improved without suffering promotion of depolymerization of the PTMG.

In addition, it has unexpectedly been found that the above-mentioned PTMG having excellent properties with respect to both heat resistance and low viscosity can be effectively and efficiently obtained by a method which comprises subjecting tetrahydrofuran (THF) to a polymerization reaction in a continuous polymerization reactor with a stirrer in the presence of a heteropolyacid catalyst, in which the polymerization reaction is performed in the presence of water in an amount sufficient to form a tetrahydrofuran organic phase and an aqueous tetrahydrofuran/catalyst phase having a specific gravity of from 1.8 to 2.3, while maintaining the retention time of tetrahydrofuran in the reactor within a specific range (at 0.5 to 20 hours) and while maintaining the motive power applied to the liquid in the reactor at a specific value (1.3 kW) or more to thereby obtain a polymerization reaction mixture comprising a reaction-formed tetrahydrofuran organic phase containing a polyoxytetramethylene glycol having a number average molecular weight of from 500 to 3,000 and a reaction-formed aqueous tetrahydrofuran/catalyst phase, separating the reaction-formed tetrahydrofuran organic phase containing the polyoxytetramethylene glycol from the polymerization reaction mixture, and adjusting the heteropolyacid content of the polyoxytetramethylene glycol to a level of 10 to 900 ppb by weight.

The present invention has been completed based on the above-mentioned findings.

Accordingly, it is an object of the present invention to provide a polyoxytetramethylene glycol (PTMG) having improved properties with respect to both heat resistance and low viscosity.

It is another object of the present invention to provide a method for effectively and efficiently producing the above-mentioned PTMG having improved properties with respect to both heat resistance and low viscosity.

The foregoing and other objects, features and advantages of the present invention will be apparent to those skilled in the art from the following detailed description and the appended claims taken in connection with the accompanying drawings.

DESCRIPTION OF REFERENCE NUMERALS

1: stirrer
2: reactor
3: water feeding tank
4: first, phase-separation vessel
5: distillation vessel
6: second, phase-separation vessel
7: adsorption column
8: distillation column
9: third, phase-separation vessel
10: vacuum distillation vessel

DETAILED DESCRIPTION OF THE INVENTION

In one aspect of the present invention, there is provided a polyoxytetramethylene glycol (PTMG) having the following characteristics:

(1) a number average molecular weight of from 500 to 3000;

(2) a molecular weight distribution of 1.8 or less in terms of the Mw/Mn ratio, wherein Mw represents the weight average molecular weight of PTMG and Mn represents the number average molecular weight of PTMG;

(3) a content of high molecular weight PTMG molecules of from 2 to 5% by weight, based on the total weight of all PTMG molecules, wherein the high molecular weight PTMG molecules are defined as PTMG molecules having molecular weights which are at least six times as large as the number average molecular weight of all PTMG molecules; and (4) a heteropolyacid content of from 10 to 900 ppb by weight.

In another aspect of the present invention, there is provided a method for producing the above-mentioned polyoxytetramethylene glycol (PTMG), which comprises subjecting tetrahydrofuran to a polymerization reaction in a continuous polymerization reactor with a stirrer in the presence of a heteropolyacid catalyst, while feeding tetrahydrofuran to the continuous polymerization reactor, the polymerization reaction being continuously performed in the presence of water, wherein the water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume (m$^3$) of the liquid in the reactor and F represents the rate (m$^3$/hour) of feeding tetrahydrofuran to the reactor so that the V/F value represents the retention time (hour or hours) of tetrahydrofuran in the reactor and while maintaining a P/V value at 1.3 kW or more wherein P represents the motive power (kW) applied to the liquid in the reactor and V is as defined above so that the P/V value represents the motive power (kW/m$^3$) applied to the liquid per unit volume thereof, to thereby obtain a polymerization reaction mixture comprising a reaction-formed tetrahydrofuran organic phase containing a polyoxytetramethylene glycol having a number average molecular weight of from 500 to 3,000 and a reaction-formed aqueous tetrahydrofuran/catalyst phase, separating the reaction-formed tetrahydrofuran organic phase containing the polyoxytetramethylene glycol from the polymerization reaction mixture, and adjusting the heteropolyacid content of the polyoxytetramethylene glycol to a level of 10 to 900 ppb by weight.

Hereinbelow, the present invention will be described in more detail.

The polyoxytetramethylene glycol (PTMG) of the present invention is a mixture of polymer chains each independently represented by the following formula (1):

$$H\text{---}(O\text{---}CH_2CH_2CH_2CH_2)_{\overline{m}}OH \quad (1)$$

wherein, m is independently an integer of from 2 to 4000, preferably from 2 to 2100. It should be noted that there is no need for the PTMG molecules of the present invention to have all molecular weights in the range of from 2 to 4000 in terms of the value of m.

The number average molecular weight (Mn) of the PTMG of the present invention is within the range of from 500 to 3000. A preferred range of Mn is 650 to 3000. The improvement in the heat resistance becomes most significant when Mn is within the range of from 700 to 2300, preferably from 800 to 2200.

The molecular weight distribution (Mw/Mn ratio) (Mw is a weight average molecular weight) of the PTMG of the present invention is 1.8 or less, preferably 1.7 or less, and more preferably 1.66 or less. A PTMG having an excellent low viscosity characteristic is obtained when the Mw/Mn ratio is 1.8 or less.

The above-mentioned Mn and Mw values are determined by gel permeation chromatography (GPC). The conditions (apparatus, types of columns, temperature, type and flow rate of carrier (eluent), molecular weight standards and the like) for the GPC analysis are shown below.

Apparatus: Shodex GPC system-11 (manufactured and sold by Showa Denko K. K., Japan);

Columns: Shodex OH pak SB806M (two columns) and Shodex OH pak SB802.5 (one column) (each manufactured and sold by Showa Denko K. K., Japan);

Detector: Differential refractometer;

Temperature: 60° C.;

Carrier: 0.02 mol/liter solution of LiBr in dimethylacetamide;

Flow rate of the carrier: 1.0 ml/min;

Sample: 100 μl of 0.8% PTMG solution in the carrier; and

Molecular weight standards: PTMG, Mn=547,000 (Mw/Mn=1.35), Mn=283,000 (Mw/Mn=1.08), Mn=99,000 (Mw/Mn=1.08), Mn=67,000 (Mw/Mn=1.04), Mn=35,500 (Mw/Mn=1.06), Mn=15,000 (Mw/Mn=1.09), Mn=6,700 (Mw/Mn=1.13), Mn=2,170 (Mw/Mn=1.12), Mn=1,300 (Mw/Mn=1.12), Mn=650 (Mw/Mn=1.18), and THF monomer.

In the present invention, for improving the heat resistance of PTMG, it is necessary that the content of high molecular weight PTMG molecules (namely, PTMG molecules having molecular weights which are at least six times as large as the number average molecular weight of all PTMG molecules) be within the range of from 2 to 5% by weight, based on the total weight of all PTMG molecules. It is more preferred that the content of the high molecular weight PTMG molecules is 2.0 to 3.5% by weight, most preferably 2.0 to 3.0% by weight, based on the total weight of all PTMG molecules. In general, low molecular weight PTMG molecules are considered to have low heat resistance, and the high molecular weight PTMG molecules defined in the present invention suppress heat decomposition of PTMG through an interaction thereof with the low molecular weight PTMG molecules which are likely to suffer heat decomposition. However, when the content of the high molecular weight PTMG molecules is more than 5% by weight, the PTMG is likely to separate into two phases, namely a solid phase consisting essentially of high molecular weight PTMG molecules and a liquid phase consisting essentially of low molecular weight PTMG molecules. Thus, the high molecular weight PTMG molecules are not uniformly dispersed in the PTMG. In such a PTMG, the improvement in the heat resistance is not large. On the other hand, when the content of the high molecular weight PTMG molecules is less than 2% by weight, the high molecular weight PTMG molecules tend to be uniformly dispersed in the PTMG; however, the improvement in the heat resistance becomes small because only a small amount of high molecular weight PTMG molecules is contained in the PTMG.

With respect to the PTMG of the present invention, the definitions of the number average molecular weight (Mn), the molecular weight distribution (Mw/Mn) and the content of high molecular weight PTMG molecules which have molecular weights of at least six times as large as the Mn are given as follows.

(1) Mn is represented by the following formula:

$$Mn=\Sigma(NiMi)/\Sigma Ni.$$

In the above formula, Ni represents the number of molecules i, and Mi represents the molecular weight of molecule i.

(2) The weight average molecular weight (Mw) which is used in the formula Mn/Mw is represented by the following formula:

$$Mw=\Sigma(NiMi^2)/\Sigma(NiMi).$$

In the above formula, Ni and Mi are as defined above. Mn in the formula Mn/Mw is defined in item (1) above.

Figure 2:
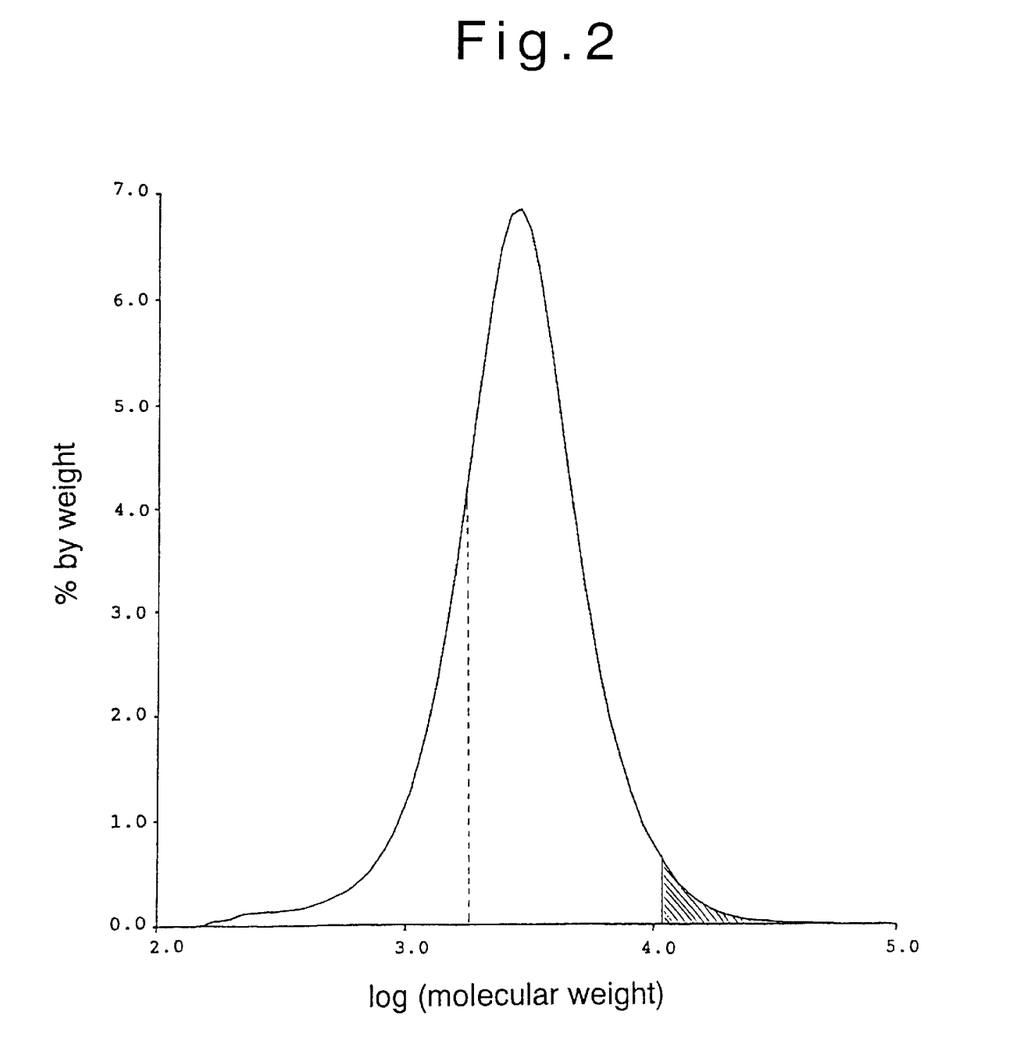
FIG. 2 is a chromatogram of the PTMG produced in Example 6 which shows the molecular weight distribution of the PTMG, wherein the abscissa shows the logarithm (log) of the molecular weight, the ordinate shows the weight % of component PTMG molecule, based on the total weight of all PTMG molecules, the intersection of the vertical straight broken line and the abscissa shows the logarithm of the number average molecular weight, and the area of the hatched portion shows the amount of the PTMG molecules having molecular weights which are at least six times as large as the number average molecular weight of all PTMG molecules.

(3) The content of PTMG molecules having molecular weights which are at least six times as large as the number average molecular weight (high molecular weight PTMG molecules), based on the total weight of all PTMG molecules, is determined from the area of a chromatogram obtained by GPC (see FIG. 2).

In the present invention, a heteropolyacid is an acid obtained by the condensation of an oxide of at least one metal species selected from the group consisting of molybdenum (Mo), tungsten (W) and vanadium (V), and an oxyacid of other elements, such as phosphorus (P), silicon (Si), arsenic (As), germanium (Ge), boron (B), titanium (Ti), cerium (Ce), cobalt (Co) and niobium (Nb). The atomic ratio of the metal species (any one or more of metals selected from the group consisting of Mo, W and V) contained in the heteropolyacid to other elements in the heteropolyacid is 2.5 to 12.

The heteropolyacid contained in the PTMG may be in the form of a salt. Specific examples of heteropolyacids include phosphomolybdic acid, phosphotungstic acid, phosphomolybdotungstic acid, phosphomolybdovanadic acid, phosphomolybdotungstovanadic acid, phosphotungstovanadic acid, phosphomolybdoniobic acid, silicotungstic acid, silicomolybdic acid, silicomolybdotungstic acid, silicomolybdotungstovanadic acid, germanotungstic acid, borotungstic acid, boromolybdic acid, boromolybdotungstic acid, boromolybdovanadic acid, boromolybdotungstovanadic acid, cobaltmolbdic acid, cobalttungstic acid, arsenomolybdic acid, arsenotungstic acid, titanomolybdic acid and ceromolybdic acid, and metal salts thereof. A preferred heteropolyacid is an oxyacid obtained by the condensation of an oxide of at least one metal species selected from the group consisting of Mo, W and V, and an oxyacid of at least one element selected from P and Si.

The heteropolyacid content of a PTMG is expressed in terms of the total amount (ppb) of molybdenum, tungsten and vanadium in the heteropolyacid, relative to the weight of the PTMG. When the amount of heteropolyacid contained in the PTMG is 10 to 900 ppb, the heat resistance of the PTMG is improved. It is preferred that the heteropolyacid content is 30 to 800 ppb by weight, more preferably 50 to 600 ppb by weight.

It is considered that individual heteropolyacid molecules influence the hydroxyl terminal of the PTMG molecule which has high mobility. In general, the hydroxyl terminals of a low molecular weight PTMG molecule have high mobility, and such hydroxyl terminals are considered to be likely to suffer heat decomposition. Since a heteropolyacid is a polyvalent acid, a plurality of acid groups in one heteropolyacid molecule interact with the hydroxyl groups in a plurality of PTMG molecules to form crosslinking sites. As a result, a PTMG-heteropolyacid complex having a low mobility is composed and the heat resistance of the PTMG is improved.

When the heteropolyacid content of a PTMG is more than 900 ppb, not only does an occurrence of discoloration of the PTMG due to the heteropolyacid become significant, but also a part of the heteropolyacid becomes crystalline to thereby promote the depolymerization of the PTMG. On the other hand, when the heteropolyacid content of a PTMG is less than 10 ppb, almost no PTMG-heteropolyacid complex is formed and, thus, the heteropolyacid is incapable of improving the heat resistance.

The contents of molybdenum, tungsten and vanadium in the PTMG are determined mainly by ICP-Mass spectrometry.

The PTMG of the present invention which has high heat resistance and low viscosity may contain components other than PTMG as long as the components cause no adverse effects on the ultimate products, such as an elastic fiber. Examples of other components include tetrahydrofuran (hereinafter, frequently referred to as "THF") used as a raw material, a cyclic PTMG by-produced during the polymerization reaction, and saturated hydrocarbons having 5 to 10 carbon atoms and activated carbons, both of which are used in the below-mentioned operations for adjusting the heteropolyacid content of a PTMG. When for example, less than 1% by weight of THF, 3% by weight or less of a cyclic PTMG, 1% by weight or less of a saturated hydrocarbon having 5 to 10 carbon atoms and less than 100 ppm of an activated carbon (each % is based on the weight of the PTMG) are incorporated into the PTMG of the present invention, substantially no adverse influences are caused on the properties of an ultimate elastic fiber. Especially, when a PTMG contains a cyclic PTMG in an amount of 0.003 to 0.03% by weight, the viscosity of the PTMG is advantageously lowered without causing a lowering of the heat resistance.

The details about how an improvement in the heat resistance of a PTMG is achieved in the present invention is still unknown. However, it is considered to be as follows. In the PTMG of the present invention, the molecular weight distribution is 1.8 or less. By virtue of this, 2 to 5% by weight of the high molecular weight PTMG molecules can be stably dispersed in the PTMG, so that the heat resistance of the PTMG as a whole is improved. In addition, the heteropolyacid contained in the PTMG is considered to cause strong interactions with the terminal hydroxyl groups of the PTMG to thereby suppress the motion of the PTMG molecules which motion is likely to be caused by the heat added to the PTMG, so that the heat resistance of the PTMG is improved.

In another aspect, the present invention provides a preferred method for producing the above-mentioned polyoxytetramethylene glycol (PTMG) having excellent properties with respect to both of high heat resistance and low viscosity.

The method of the present invention comprises subjecting tetrahydrofuran to a polymerization reaction in a continuous polymerization reactor with a stirrer in the presence of a heteropolyacid catalyst, while feeding tetrahydrofuran to the continuous polymerization reactor, the polymerization reaction being continuously performed in the presence of water, wherein the water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume ($m^3$) of the liquid in the reactor and F represents the rate ($m^3$/hour) of feeding tetrahydrofuran to the reactor so that the V/F value represents a retention time (hour or hours) of tetrahydrofuran in the reactor and while maintaining a P/V value at 1.3 kW or more wherein P represents the motive power (kW) applied to the liquid in the reactor and V is as defined above so that the P/V value represents the motive power (kW/$m^3$) applied to the liquid per unit volume thereof, to thereby obtain a polymerization reaction mixture comprising a reaction-formed tetrahydrofuran organic phase containing a polyoxytetramethylene glycol having a number average molecular weight of from 500 to 3,000 and a reaction-formed aqueous tetrahydrofuran/catalyst phase, separating the reaction-formed tetrahydrofuran organic phase containing the polyoxytetramethylene glycol from the polymerization reaction mixture, and adjusting the heteropolyacid content of the polyoxytetramethylene glycol to a level of 10 to 900 ppb by weight.

The reaction system used in the method of the present invention comprises a tetrahydrofuran (THF) organic phase and an aqueous THF/catalyst phase which comprises a solution of the heteropolyacid catalyst in a THF/water mixture and which has a specific gravity of from 1.8 to 2.3. A heteropolyacid is sparingly soluble in an anhydrous THF, but well soluble in a mixed solvent prepared by adding a small amount of water to THF. A heteropolyacid solution having a specific gravity of from 1.8 to 2.3 can be prepared by dissolving a heteropolyacid in the mixed solvent in which the amounts of water and THF contained therein has been adjusted so that the specific gravity of the resultant heteropolyacid solution falls within the above-mentioned range. When the thus prepared heteropolyacid solution is added to THF, the resultant reaction system separates into two phases, namely a THF organic phase and an aqueous THF/catalyst phase (hereinafter, frequently referred to as "aqueous THF/catalyst phase" or simply as "catalyst phase"). The reason why such a reaction system is obtained is not fully elucidated, but it is considered that a small amount of water is coordinated to the heteropolyacid.

Hereinbelow, an explanation is made on the representative example of a method for producing the PTMG of the present invention.

In general, PTMG is produced by a cationic polymerization of THF in the presence of an acid catalyst. However, with the conventional polymerization method, it is very difficult to produce a PTMG of the present invention which has specific molecular weight distribution properties, that is, a PTMG having a molecular weight distribution of 1.8 or less and having a limited content of 2 to 5% by weight with respect to high molecular weight PTMG molecules, wherein the high molecular weight PTMG molecules have molecular weights which are at least six times as large as the number average molecular weight of all PTMG molecules. Specifically, the reaction conditions need to be controlled precisely for producing such a PTMG.

Illustratively stated, in the method of the present invention, use is made of a continuous polymerization reactor with a stirrer, wherein THF can be fed continuously to the reactor and the produced PTMG can be withdrawn continuously from the reactor. The above-mentioned heteropolyacid is used as a polymerization catalyst, and the polymerization reaction is continuously performed in the presence of water in an amount sufficient to form a THF organic phase (THF phase) and an aqueous THF/catalyst phase, while controlling the retention time (V/F) of THF in the reactor {wherein V represents the volume ($m^3$) of the liquid in the reactor and F represents the rate ($m^3$/hour) of feeding THF to the reactor) and while controlling the motive power (P/V) applied to the liquid per unit volume thereof (wherein P represents the motive power (kW) applied to the liquid in the reactor and V represents the volume ($m^3$) of the liquid in the reactor}. In addition, as mentioned above, during the continuous production of PTMG, the two phases (the THF organic phase and the aqueous THF/catalyst phase), which are important for producing the PTMG of the present invention, can be easily formed by measuring and adjusting the specific gravity of the aqueous THF/catalyst phase to 1.8 to 2.3 so as to control the amount of water coordinated to the heteropolyacid. The molecular weight distribution properties of the obtained PTMG can be controlled by controlling the specific gravity of the catalyst phase, the retention time (V/F) of THF in the reactor and the motive power (P/V) applied to the liquid per unit volume of the reactor.

It should be noted that Unexamined Japanese Patent Application Laid-Open Specification No. 63-30932 (corresponding to U.S. Pat. No. 4,568,775) describes that the amount of water coordinated to a heteropolyacid catalyst influences the catalytic activity of the catalyst, and that there is a correlation between the amount of water coordinated to a heteropolyacid catalyst and the number average molecular weight of a PTMG obtained by polymerizing THF in the presence of the heteropolyacid catalyst. However, although this patent document describes that the molecular weight distribution of the obtained PTMG is narrow, it contains no descriptions about controlling the molecular weight distribution properties.

During the course of the studies on the reaction conditions for stably producing the PTMG of the present invention which has a specific molecular weight distribution properties, the present inventors have found that the molecular weight distribution properties of a PTMG can be controlled precisely without changing the number average molecular weight thereof by controlling the retention time of the monomer (THF) which reacts in the catalyst phase while feeding THF in a constant amount, relative to the volume of the aqueous THF/catalyst phase in the reactor, to the reactor. It is considered that the substantial time of reaction can be made constant by controlling both the amount of and the specific gravity of the aqueous THF/catalyst phase in the reactor. As a result, it becomes possible to control the molecular weight distribution properties of the produced PTMG, while maintaining the number average molecular weight of the PTMG at a constant value.

In the above-mentioned polymerization method, a part of the polymerization product (PTMG) is sampled during the polymerization reaction so as to determine the molecular weight distribution properties thereof. Based on the results of the determination, the molecular weight distribution properties are controlled in the following manner.

A reaction system for polymerizing THF using a heteropolyacid as a catalyst is an emulsion in which a reaction-formed THF organic phase containing a polymer and a reaction-formed aqueous THF/catalyst phase are mutually dispersed in each other both in the form of globules. The polymerization reaction is considered to take place in the aqueous THF/catalyst phase. In accordance with the progress of the polymerization reaction, the PTMG dissolved in the aqueous THF/catalyst phase is partitioned between the aqueous THF/catalyst phase and the THF organic phase, and the state of partition reaches an equilibrium under specific reaction conditions and becomes stationary.

Therefore, in order to obtain a PTMG having a specific average number molecular weight, the retention time of raw material THF in the aqueous THF/catalyst phase is controlled, so that the molecular weight distribution properties of the thus produced PTMG can be controlled. With respect to the PTMG produced in the aqueous THF/catalyst phase, the polymerization reaction proceeds as an equilibrium reaction, but the polymerization degree is considered to vary in accordance with the retention time of THF (monomer) in the aqueous THF/catalyst phase. Since the polymer in the aqueous THF/catalyst phase is partitioned to the THF organic phase, the molecular weight distribution properties of the final PTMG reflect the molecular weight distribution properties of the PTMG in the aqueous THF/catalyst phase.

For broadening the molecular weight distribution of a PTMG, the retention time distribution of the monomer (THF) in the aqueous THF/catalyst phase needs to be broadened, whereas, for narrowing the molecular weight distribution of a PTMG, the retention time distribution of the monomer in the aqueous THF/catalyst phase needs to be narrowed. The retention time of the monomer in the aqueous THF/catalyst phase can be controlled, for example, by controlling the area of and the time of contact between the aqueous THF/catalyst phase and the THF organic phase.

The following methods (1) and (2) are the preferred methods for controlling the retention time distribution of the monomer in the catalyst phase.

(1) The retention time distribution of the monomer in the aqueous THF/catalyst phase is controlled by varying the retention time (V/F) of the monomer in the reactor. Specifically, V/F value is increased for broadening the molecular weight distribution of the polymer, and the V/F value is decreased for narrowing the molecular weight distribution of the polymer.

(2) Using a polymerization reactor with a stirrer, the retention time distribution of the monomer in the aqueous THF/catalyst phase is controlled by varying the motive power (P/V) applied to the liquid (per unit volume thereof) in the reactor. Specifically, P/V value is decreased for broadening the molecular weight distribution of the polymer, and the P/V value is increased for narrowing the molecular weight distribution of the polymer.

In the above methods (1) and (2), V represents the volume ($m^3$) of the liquid in the reactor, F represents the rate ($m^3$/hour) of feeding THF to the reactor, and P represents the motive power (kW) applied to the liquid in the reactor.

The mechanism in the control of the molecular weight distribution of a PTMG in method (1) above by varying the V/F value is explained below.

During the continuous polymerization reaction, the variation in the V/F value of the monomer leads to a variation in the average retention time of the monomer in the reactor. When the average retention time is long, the retention time distribution of the monomer in the aqueous THF/catalyst phase becomes broad. On the other hand, when the average retention time of the monomer is short, the retention time distribution of the monomer in the aqueous THF/catalyst phase becomes narrow. This means that, when the V/F value is increased, the retention time distribution of the monomer in the aqueous THF/catalyst phase becomes large, and the molecular weight distribution of the produced PTMG becomes broader. Contrary to the above, when the V/F value is decreased, the retention time distribution of the monomer in the aqueous THF/catalyst phase becomes small, and the molecular weight distribution of the produced PTMG becomes narrower.

In accordance with the above-mentioned mechanism, the molecular weight distribution of the PTMG can be controlled by varying the V/F value of the monomer used in the continuous reaction for producing the PTMG.

The molecular weight distribution of a PTMG can also be controlled as in method (2) above, that is, by varying the P/V value. When the value of P/V applied to the liquid in the reactor is varied, the average particle diameters of globules of the aqueous THF/catalyst phase and THF organic phase become varied. This variation in the average particle diameters of the globules results in the variation in the area of contact between the aqueous THF/catalyst phase and the THF organic phase, as well as the variation in the frequency of the coalescence and redivision of the above-mentioned globules (hereinbelow, this frequency is referred to as the "coalescence-redivision frequency of the globules"). It is conceivable that these variations cause the variations in the amounts of substances which are moving from one of the two phases to the other phase. It is apparent that the retention time distribution of the monomer in the aqueous THF/catalyst phase can be controlled by varying the value of P/V applied to the liquid in the reactor and, therefore, it is also possible to control the molecular weight distribution of a PTMG by varying the P/V value.

Specifically, when the P/V value is increased, the average particle diameters of the globules of the aqueous THF/catalyst phase and the globules of the THF organic phase become small, thereby increasing both the area of contact between the two phases and the coalescence-redivision frequency of the globules. As a consequence, the amounts of substances which are moving between the catalyst phase and the organic phase become increased, and this increase causes the retention time of the monomer molecules in the catalyst phase to become uniform and the retention time distribution of the monomer in the catalyst phase to become narrow. As a result, a PTMG having a narrow molecular weight distribution is produced. Contrary to the above, the decrease in the P/V value causes both the area of contact between the two phases and the coalescence-redivision frequency of the globules to become decreased, and the retention time distribution of the monomer in the catalyst phase to become broad. As a result, a PTMG having a broad molecular weight distribution is produced.

In accordance with the above-mentioned mechanism, using a reactor with a stirrer, the value of P/V applied to the liquid in the reactor can be varied to control the molecular weight distribution of a PTMG without varying the number average molecular weight thereof.

Specifically, in order to produce a PTMG having a broader molecular weight distribution and having a higher content of the high molecular weight PTMG molecules whose molecular weights are at least six times as large as the number average molecular weight, the 1/(P/V) value (i.e., a reciprocal of the motive power applied to the liquid per unit volume of the reactor) and the V/F value (i.e., the retention time of the monomer) are increased simultaneously or successively. On the other hand, in order to produce a PTMG having a narrower molecular weight distribution and having a smaller content of the high molecular weight PTMG molecules, the 1/(P/V) value and V/F value are decreased simultaneously or successively.

By using the above-mentioned methods (1) and (2) for controlling the molecular weight distribution properties of the PTMG, it becomes possible to stably produce the PTMG of the present invention which has the specific molecular weight distribution properties.

Hereinbelow, the preferred method for polymerizing THF is explained in detail.

First, operation conditions for producing a PTMG having a specific number average molecular weight are determined by conducting a test operation. Specifically, a PTMG is produced by subjecting THF to a ring-opening polymerization reaction in a continuous polymerization reactor with stirrer in the presence of a heteropolyacid catalyst, wherein the ring-opening polymerization reaction is continuously performed in the presence of water, so that the water is present in an amount sufficient to form the following two phases in the reactor: a THF organic phase and an aqueous THF/catalyst phase comprising a solution of the heteropolyacid catalyst in a THF/water mixture and having a specific gravity of from 1.8 to 2.3.

The test operation comprises the following steps (a) to (d):

(a): a step of preparing the following two calibration curves under the reaction conditions for producing a PTMG having a desired number average molecular weight: a calibration curve showing the relationship between the motive power (P/V) applied to the liquid per unit volume of the reactor and the molecular weight distribution properties of the PTMG, and a calibration curve showing the relationship between the retention time (V/F) of THF and the molecular weight distribution properties of the PTMG;

(b): a step comprising sub-steps of sampling a portion of the reaction mixture being produced in the polymerization reactor, determining the number average molecular weight of the produced PTMG contained in the sampled reaction mixture, and modifying the reaction conditions when the number average molecular weight of the produced PTMG is different from the desired value so as to produce a PTMG having a desired number average molecular weight;

(c): a step of determining the molecular weight distribution properties of the produced PTMG when the PTMG has the desired number average molecular weight; and (d): a step of finally adjusting the reaction conditions when the molecular weight distribution properties of the PTMG determined in step (c) above are different from the desired values, which comprises correcting the calibration curves obtained in step (a) based on the molecular weight distribution properties determined above and adjusting the motive power (P/V) and retention time (V/F) in accordance with the corrected calibration curves, so as to enable a PTMG having desired molecular weight distribution properties to be produced.

In general, a highly pure THF (containing impurities in an amount of less than 500 ppm by weight) is used as a raw material for preparing the calibration curves in step (a). Whereas, in step (b), THF is recycled to the reaction system during the stable operation of the reactor and the recycled THF is used as a raw material. Since the recycled THF contains some impurities, there is a slight difference in some reaction conditions (such as reaction rate) between the reaction using pure THF and the reaction using recycled THF. That is, it is difficult to directly apply the calibration curves prepared with respect to PTMG produced within a short operation time to a production of a PTMG by a stationary, stable operation of the reactor because the composition of the recycled THF varies to some extent, depending on the operation conditions of the reactor. Step (c) is necessary for overcoming this problem. The calibration curves prepared in step (a) can be corrected based on the results obtained in step (c) to thereby obtain the calibration curves for the commercial scale PTMG production. In step (d), the reaction conditions for producing PTMG are determined in accordance with the corrected calibration curves.

Hereinbelow, a further explanation is made with respect to the above-mentioned steps (a) to (d).

Step (a): The relationships among the molecular weight distribution of a PTMG having a predetermined number average molecular weight, the P/V value and the V/F value are obtained in the form of empirical formulae. The tolerance in the number average molecular weight (i.e., the difference between the desired number average molecular weight and the actual number average molecular weight of the produced PTMG) varies depending on the use of the PTMG. For example, when the PTMG is used as a raw material for an elastic fiber, it is preferred that the tolerance in the number average molecular weight is ±100, more advantageously ±50. When the PTMG is used as a starting material for a reaction, it is more preferred that the tolerance in the number average molecular weight is ±30.

For example, when a PTMG having a number average molecular weight of 1800 is produced in the presence of a heteropolyacid as a catalyst, two relationships respectively represented by the following formulae (2) and (3) can be experimentally obtained:

$$Mw/Mn = K(V/F)^\alpha \qquad (2), \text{ and}$$

$$Mw/Mn = K'(P/V)^\beta \qquad (3)$$

wherein K, α, K' and β are constants which can be experimentally determined.

Step (b): Under conditions determined so as to obtain a PTMG having a desired number average molecular weight, a polymerization reaction of THF is performed in the presence of water, wherein the water is present in an amount sufficient to form a THF organic phase and an aqueous THF/catalyst phase which has a specific gravity of from 1.8 to 2.3, while maintaining the specific gravity of the aqueous THF/catalyst phase. Subsequently, the number average molecular weight of the produced PTMG is determined. When the determined value of number average molecular weight of the produced PTMG is different from the desired value, the polymerization reaction conditions (such as the amount of water coordinated to the heteropolyacid, the reaction temperature and the like) are regulated by conventional methods so as to obtain a PTMG having a desired number average molecular weight.

Step (c): The molecular weight distribution properties of the PTMG having the desired number average molecular weight are determined by GPC.

Step (d): When the molecular weight distribution properties of the PTMG which have been determined in step (c) above are different from the desired values, the P/V value and the V/F value are regulated in accordance with the calibration curves (formulae) obtained in step (a) above so as to control the molecular weight distribution properties of the PTMG.

If desired, steps (b) to (d) are repeated until a PTMG having both the desired number average molecular weight and the desired molecular weight distribution properties is obtained.

In order to control the molecular weight distribution properties of a PTMG so that the content of the high molecular weight PTMG molecules becomes 2 to 5% by weight, the retention time (V/F) of THF must be in the range of from 0.5 to 20 hours, preferably from 2 to 15 hours. In the production of a PTMG having a desired number average molecular weight, when the V/F value is small, the conversion and efficiency of the reaction become lowered. On the other hand, when the V/F value is large, the reaction time becomes long. Therefore, it is preferred that the V/F value is selected within the above-mentioned range.

In order to produce the PTMG of the present invention, that is, a PTMG having a molecular weight distribution of 1.8 or less and a content of high molecular weight PTMG molecules of from 2 to 5% by weight, the following three factors should be considered for determining the polymerization conditions: the specific gravity of the aqueous THF/catalyst phase, the V/F value and the motive power (P/V) of the reactor. For this reason, it is difficult to univocally determine the specific numerical value range of the motive power. In general, when the V/F value and the volume of the aqueous THF/catalyst phase are fixed, the higher the specific gravity of the aqueous THF/catalyst phase, the higher the number average molecular weight of produced PTMG. When the specific gravity and volume of the aqueous THF/catalyst phase are fixed, the longer the V/F, the higher the number average molecular weight of the produced PTMG. In the present invention, when the specific gravity of the aqueous THF/catalyst phase is in the range of from 1.8 to 2.3 and the V/F value is from 0.5 to 20 hours, the P/V value should be maintained at 1.3 kW/m³ or more. In view of the fluctuation of the operation conditions during the production of the PTMG, if the P/V value is maintained at 1.6 kW/m³ or more, it is possible to stably produce the PTMG of the present invention having a molecular weight distribution of 1.8 or less and a content of high molecular weight PTMG molecules of 2 to 5% by weight.

Hereinbelow, an explanation is made with respect to the continuous polymerization reactor with a stirrer, which is used for producing the PTMG of the present invention.

The polymerization reactor may be or may not be equipped with a baffle on the inner wall of the reactor. It is preferred that the polymerization reactor is equipped with a baffle.

With respect to the liquid contents in the polymerization reactor, the L/D value (wherein L represents the depth of the liquid contents in the polymerization reactor and D represents the diameter of the polymerization reactor) is from 0.5 to 10, preferably from 1 to 3.

There is no particular limitation with respect to the morphology of the impeller. For example, the impeller is selected from an anchor impeller, a turbine, a propeller, a plane blade puddle, a curved blade puddle, a Pfaudler type impeller, and a Bulmarzin type impeller, preferably from an anchor impeller, a turbine, a propeller and puddles. The impellers may have an angled blade or a pitched blade. The width of the blades greatly varies depending on the type (morphology) of the impeller, and is not particularly limited. The number of the blades attached to the shaft of the impeller is generally from 1 to 10, usually from 1 to 3. However, an impeller having more than ten blades and an impeller having only one blade can be used without causing any problem.

With respect to the size of the impeller, it is preferred that the value d/D (wherein d represents the diameter of the blade of the impeller, which is twice as long as the length of the blade of the impeller; and D represents the diameter of the polymerization reactor) is from 0.1 to 0.95, preferably from 0.3 to 0.8.

The preferred range of the revolution speed of the stirrer greatly varies depending on the structure of the impeller. Therefore, the revolution speed of the stirrer is controlled in accordance with the structures of the reactor and impeller so as to give a motive power (P) within the desired range. Basically, it is preferred that the impeller has a structure such that a large motive power is obtained by a slow revolution speed.

Hereinbelow, brief explanation is made with respect to the influence of the motive power (P) on the number average molecular weight (Mn) of a PTMG, and the method for estimating the magnitude of the motive power used in a prior art document, based on this influence and effects thereof.

The motive power (P) not only determines the molecular weight distribution (Mw/Mn) and the content of high molecular weight PTMG molecules (whose molecular weights are at least six times as large as the number average molecular weight of all PTMG molecules), but also influences the degree of polymerization (in other words, the number average molecular weight of a PTMG). Especially when the motive power is lower than 1.1 kW/m³, the influence of the motive power on the number average molecular weight is extremely large.

Until now, many patent documents disclosed the production of a PTMG from THF and water in the presence of a heteropolyacid catalyst. However, none of these patent documents describe the motive power used for producing the PTMG. The fact that the variation in the motive power applied to the liquid in the reactor causes the variation in the number average molecular weight of a PTMG has been found for the first time by the present inventors.

The present inventors have chosen the above-mentioned Examined Japanese Patent Application Publication No. 63-30932 as a typical example of the prior art document in this technical field, and conducted a reworking of Example 1 of this prior art document which uses a phosphomolybdic acid (the number of water coordinated thereto=6.0) as a catalyst. Specifically, the present inventors conducted the reworking of Example 1 while varying only the motive power. As a result, the relationship among the motive power, the number average molecular weight of a PTMG and the content of high molecular weight PTMG molecules has become clear. The results are shown in Table 1 below.

TABLE 1

| Motive power (kW/m$^3$) | 0.004 | 0.4 | 2.6 | 17.9 |
|---|---|---|---|---|
| Mn | 950 | 1050 | 1100 | 1150 |
| Content of high molecular weight PTMG molecules (% by weight) | 5.6 | 5.4 | 4.9 | 4.5 |

Table 1 above clearly shows that the increase in the motive power causes an increase in the number average molecular weight of a PTMG. It should be noted that Example 1 of Examined Japanese Patent Application Publication No. 63-30932 describes that the PTMG having a number average molecular weight of 1000 was obtained by a polymerization reaction conducted in a batchwise manner. (In a batchwise polymerization reaction, water contained in a reaction system is consumed in accordance with the progress of the polymerization reaction, and the specific gravity of the aqueous THF/catalyst phase is gradually increased.) From Table 1 above, it is easily estimated that the motive power applied in Example 1 is smaller than 0.4 kW/m$^3$. Further, the estimated content of high molecular weight PTMG molecules is more than 5.4% by weight.

The results of the above-mentioned reworking show that the motive power employed in the conventional batchwise polymerization reaction of THF was approximately 0.4 kW/m$^3$, and that, therefore, the motive power required in the present invention (i.e., 1.3 kW/m$^3$ or more) is a peculiar value in this technical field.

There is no particular limitation with respect to the amount of the heteropolyacid used in the present invention for polymerizing THF. However, when the amount of the heteropolyacid in the reaction system is too small, the polymerization rate is lowered. Therefore, it is preferred that the weight ratio of the heteropolyacid to the monomer (THF) is from 0.05 to 10, advantageously from 1 to 3. It is preferred that the ratio of the volume of the aqueous THF/catalyst phase to the volume of the liquid in the reactor is from 0.19 to 0.81. Further, in order to produce a PTMG having a desired, predetermined value of number average molecular weight, the specific gravity of the aqueous THF/catalyst phase is maintained within the range of from 1.8 to 2.3. The water in the reactor is consumed during the continuous polymerization reaction, so water must be fed into the reaction system to maintain the specific gravity of the aqueous THF/catalyst phase within the above-mentioned range.

When the polymerization temperature is too high, depolymerization of a polymer is likely to occur, thereby lowering the polymerization degree of the polymer. Therefore, in the present invention, the polymerization temperature is maintained at 0 to 100° C., preferably 30 to 80° C.

The polymerization reaction proceeds by the mixing of the monomer (THF) with the heteropolyacid. That is, no solvent is necessary for this polymerization reaction. However, if desired, the reaction system may contain an inert solvent. For example, a saturated hydrocarbon having 5 to 10 carbon atoms (which is used in the below-mentioned operation for adjusting the heteropolyacid content of the polyoxytetramethylene glycol) can be contained in the raw material liquid in an amount of 1% by weight or less, preferably 0.3% by weight or less.

The desired PTMG of the present invention can be obtained by obtaining a reaction mixture of a ring-opening polymerization reaction of THF and adjusting the heteropolyacid content of the obtained reaction mixture to 10 to 900 ppb by weight. The heteropolyacid content can be adjusted by conventional methods, such as a method disclosed in Unexamined Japanese Patent Application Laid-Open Specification Nos. 61-118420, 61-115934 and 61-123629 (each corresponding to U.S. Pat. No. 4,677,231). However, it is preferred that the heteropolyacid content is adjusted by a method which comprises the following steps (i) to (vi):

(i) separating the polymerization reaction mixture into a reaction-formed aqueous THF/catalyst phase and a reaction-formed THF organic phase containing a PTMG, and obtaining the THF organic phase containing PTMG;

(ii) distilling off a portion of THF in the obtained THF organic phase, to thereby obtain a PTMG concentrate;

(iii) adding at least one saturated hydrocarbon having 5 to 10 carbon atoms ($C_5$–$C_{10}$ saturated hydrocarbon) to the PTMG concentrate so that a catalyst phase (containing a portion of the heteropolyacid dissolved in the PTMG concentrate) and an organic phase (composed mainly of the above-mentioned saturated hydrocarbon and PTMG) are formed, and subsequently removing the catalyst phase;

(iv) after removal of the catalyst phase, subjecting the organic phase to a treatment with an activated carbon so that the heteropolyacid dissolved in the organic phase is adsorbed on the activated carbon and removed from the organic phase;

(v) distilling off THF remaining in the organic phase so that a saturated hydrocarbon phase and a PTMG phase are formed, and subsequently removing the saturated hydrocarbon phase; and (vi) after removal of the saturated hydrocarbon phase, distilling off the low boiling point substances contained in the remaining PTMG phase under reduced pressure, so as to obtain a PTMG in which the heteropolyacid content is adjusted to 10 to 900 ppb by weight.

Hereinbelow, the above-mentioned steps (i) to (vi) for adjusting the heteropolyacid content of a PTMG are explained in more detail.

Step (i) Phase Separation of the Polymerization Reaction Mixture into a THF Organic Phase and an Aqueous THF/catalyst Phase:

The polymerization reaction mixture is withdrawn from the reaction system at the same rate as the rate of the feeding of the monomer (THF) and introduced into a phase-separation vessel (such as a decanter), to thereby separate the reaction mixture into a reaction-formed THF organic phase (composed mainly of THF and the PTMG) and a reaction-formed aqueous THF/catalyst phase. The THF organic phase is withdrawn from the phase-separation vessel and subjected to the next-step treatment. The separated aqueous THF/catalyst phase is recycled to the reaction system.

The THF organic phase contains 4 to 30% by weight of the PTMG, and the higher the degree of polymerization of the PTMG, the higher the PTMG content of the THF organic phase. For example, when a PTMG having an Mn of approximately 1800 is produced, the PTMG content of the THF organic phase is approximately 23 to 25% by weight.

Step (ii) Removal of a Portion of THF in the THF Organic Phase by Distillation:

A portion of unreacted THF in the THF organic phase is distilled off to thereby obtain a PTMG concentrate. The weight ratio of the THF remaining in the PTMG concentrate to the PTMG is 0.1 to 3, preferably from 0.5 to 1.5. When the weight ratio of the remaining THF is less than 0.1, the efficiency of phase-separation of the catalyst phase (which occurs in Step (iii) described below by the addition of a saturated hydrocarbon to the PTMG concentrate) becomes low. In other words, the amount of the heteropolyacid (dissolved in the THF organic phase) which is removed by the phase-separation becomes small. This lowering of the efficiency of the phase-separation can be explained as follows. Since the solubility of a PTMG in a saturated hydrocarbon is low, when the weight ratio of THF remaining in the PTMG concentrate to the PTMG is low, the mixture of the saturated hydrocarbon and PTMG concentrate is readily separated into a PTMG phase and a hydrocarbon phase. This phase separation results in a lowering of the efficiency of phase-separation of the catalyst dissolved in the PTMG. On the other hand, when the weight ratio of the remaining THF is more than 3, the remaining THF functions as a good solvent for the heteropolyacid and lowers the efficiency of phase-separation of the catalyst phase.

Step (iii) Addition of a Saturated Hydrocarbon to the PTMG Concentrate and the Phase-separation of the Resultant Mixture into a Catalyst Phase and an Organic Phase:

Examples of saturated hydrocarbons to be added to the PTMG concentrate include $C_5$–$C_{10}$ saturated hydrocarbons, such as cyclopentane, cyclohexane, cycloheptane, cyclooctane, cyclononane, cyclodecane, methylcyclopentane, methylcyclohexane, 2-ethylhexane, pentane, hexane, heptane, octane, nonane and decane. These saturated hydrocarbons can be used individually or in combination.

The amount of the saturated hydrocarbon used is from 10 to 90% by weight, preferably from 30 to 80% by weight, more preferably from 50 to 70% by weight, based on the total weight of a liquid mixture obtained by adding the saturated hydrocarbon to the PTMG concentrate.

In this step (iii), two liquid phases, namely a catalyst phase containing a portion of the heteropolyacid contained in the PTMG concentrate and an organic phase composed mainly of the saturated hydrocarbon and PTMG, are formed. The catalyst phase is separated and removed from the organic phase, and the organic phase is subjected to a treatment with an activated carbon in the subsequent step (iv).

Step (iv) Removal of the Catalyst in the Organic Phase by the Treatment with an Activated Carbon:

In general, the heteropolyacid content of the organic phase (which is subjected to step (iv)) is 1 to 100 ppm.

When the organic phase is applied at a rate of 100 kg/hour to a column packed with an activated carbon, the activated carbon is used in an amount such that the absolute value of $\gamma$ represented by the following formula (4) is in the range of from 5 to 100:

$$\gamma = \alpha/\beta \qquad (4)$$

wherein $\alpha$ is the amount (kg) of the activated carbon, and $\beta$ is the heteropolyacid content (ppm) of the organic phase.

In the step for removing the heteropolyacid using an activated carbon, when the temperature of the column packed with an activated carbon is maintained within the range of from 15 to 60° C. and the time of contact between the heteropolyacid and the activated carbon is controlled within the range of from 5 to 60 minutes, it becomes possible to easily adjust the heteropolyacid content of the final PTMG to 10 to 900 ppb without being influenced by the variation in the initial heteropolyacid content of the organic phase.

The treatment of the organic phase with an activated carbon can also be conducted by a method where an adsorption vessel is used in place of a column, and the activated carbon having adsorbed thereon the heteropolyacid is removed from the treated organic phase by filtration with a filter.

By the above-described treatment with an activated carbon, almost all of the heteropolyacid contained in the organic phase is adsorbed on the activated carbon. However, with respect to the heteropolyacid molecules which are interacting with the terminal hydroxyl groups of the PTMG molecules, the adsorption of such heteropolyacid molecules on the activated carbon is in a specific equilibrium state. Therefore, it is possible to preserve the heteropolyacid molecules which are interacting with the terminal hydroxyl groups of the PTMG molecules, in the organic phase with high selectivity.

With respect to the heteropolyacid molecules which are interacting with the terminal hydroxyl groups of the PTMG molecules, their heat stabilization action resulting from the suppression of the thermal motion of the terminal hydroxyl groups of the PTMG molecules is strongly exhibited than their depolymerizing action which is conventionally considered in this technical field to be the adverse effects of the residual heteropolyacid catalyst. Accordingly, the heat resistance of the PTMG is enhanced by the presence of the heteropolyacid in a specific amount.

That is, by the above-described treatment with an activated carbon, the amount of heteropolyacid contained in the saturated hydrocarbon is rendered extremely low, and the variation in the amount of the heteropolyacid remaining in the PTMG is kept to a minimum so that the amount of the heteropolyacid molecules interacting with the terminal hydroxyl groups of the PTMG molecules is controlled within the predetermined range.

Step (v) Removal of a Saturated Hydrocarbon Phase from the Organic Phase by Phase-separation:

In this step, THF remaining in the organic phase (after the activated carbon treatment) is distilled off so that the saturated hydrocarbon in the organic phase can be removed by phase-separation, namely the separation into a saturated hydrocarbon phase and a PTMG phase. The THF concentration in the still residue after removal of THF is 0.1% or less, preferably 100 ppm or less, and more preferably 50 ppm or less. By lowering the THF concentration as much as possible, it becomes possible to not only separate the organic phase into a saturated hydrocarbon phase and a PTMG phase in a short time, but also lower both the saturated hydrocarbon content of the PTMG phase and the PTMG content of the saturated hydrocarbon phase. As a result, the yield of the polymerization product is improved by the lowering of the amount of the PTMG dissolved in the saturated hydrocarbon phase. Further, the load of the distillation conducted in the subsequent step (vi) for removing the saturated hydrocarbon is reduced.

Step (vi) Removal of Low-boiling Point Substances from the PTMG Phase:

Low-boiling point substances contained in the PTMG phase (which has been separated from the saturated hydrocarbon phase) are removed by distillation under reduced pressure. In this distillation, the degree of vacuum is generally 5 Torr or less, preferably 0.5 Torr or less, more preferably 0.005 Torr or less. By conducting the distillation under the degree of vacuum as high as possible, not only can the distillation temperature be lowered, but also the time in which the PTMG is exposed to a high temperature is shortened. As a result, a thermal decomposition of the PTMG during the distillation is suppressed. Therefore, it is preferred that the distillation is conducted under the degree of vacuum as high as possible. In addition, the distillation temperature is generally in the range of from 60 to 160° C., preferably in the range of from 70 to 130° C.

PTMG having the heteropolyacid content of from 100 ppb to 900 ppb is obtained by conducting the above-mentioned steps (i) to (vi).

As described above, the PTMG of the present invention can be produced by a method which comprises:

subjecting THF to a ring opening-polymerization reaction in a continuous polymerization reactor with stirrer in the presence of a heteropolyacid catalyst, to thereby obtain a PTMG having a specific molecular weight distribution properties; and adjusting the heteropolyacid content of the PTMG by removing a portion of the catalyst (heteropolyacid) from the polymerization reaction mixture.

Hereinbelow, an explanation is made with respect to the method for producing the PTMG of the present invention, with reference to FIG. 1 which shows a typical production system for PTMG.

In the production system of FIG. 1, THF (monomer) and an aqueous THF solution of a heteropolyacid (catalyst) (hereinbelow, this solution is referred to as the "catalyst solution" (CS)) is introduced into continuous polymerization reactor 2 equipped with stirrer 1, and the resultant reaction system in reactor 2 is stirred vigorously. The specific gravity of the catalyst solution (CS), the retention time (V/F) of THF and the motive power (P/V) applied to the liquid per unit volume of the reactor correlate to each other. Therefore, for producing a PTMG having a specific molecular weight distribution properties, the polymerization of THF is performed under conditions wherein the specific gravity of the catalyst solution (CS), the V/F value and the P/V value are appropriately selected from the above-mentioned ranges. During the polymerization reaction, THF is continuously fed to reactor 2 and water from water feeding tank 3 is fed to reactor 2 so as to maintain the amount of water coordinated to the catalyst (in other words, so as to maintain the amount of water in reactor 2) at a desired, predetermined level. The polymerization reaction mixture is continuously withdrawn from reactor 2 and transferred to first, phase-separation vessel 4 so as to be separated into a reaction-formed THF phase (upper phase) and a reaction-formed aqueous THF/catalyst phase (CP) (lower phase). The aqueous THF/catalyst phase (CP) is recycled to reactor 2. The THF phase (containing the PTMG produced by the polymerization reaction) is withdrawn from phase-separation vessel 4 at the same rate as the rate of the feeding of THF.

The THF phase withdrawn from phase-separation vessel 4 is introduced to distillation vessel 5. A portion of THF in the THF phase is distilled off to thereby obtain a PTMG concentrate. The PTMG concentrate is a solution of PTMG in which the PTMG concentration has been increased in distillation vessel 5. The PTMG concentrate is introduced to second, phase-separation vessel 6. An organic solvent (S) (such as a $C_5$–$C_{10}$ saturated hydrocarbon) is added to the PTMG concentrate in second, phase-separation vessel 6, and after mixing the solvent and the PTMG concentrate by stirring, the resultant mixture is separated into two liquid phases. By this phase-separation, a catalyst phase (CP) containing a portion of the catalyst dissolved in the polymerization reaction mixture (PTMG concentrate) (lower phase) and an organic phase composed mainly of the organic solvent (S) and PTMG (upper phase) are formed. Subsequently, the catalyst phase (CP) is removed. The remaining organic phase is subjected to an adsorption treatment with an activated carbon (AC) by, for example, introducing the organic phase into column 7 packed with an activated carbon. By this adsorption treatment, almost all of the catalyst dissolved in the organic phase is adsorbed on the activated carbon (AC), but a portion of the catalyst which is considered to be interacting with the terminal hydroxyl groups of the PTMG molecules remains in the organic phase. The organic phase which passed through column 7 packed with an activated carbon is introduced to distillation column 8 to distill off THF from the organic phase. THF is distilled off from the organic phase in an amount sufficient to cause phase-separation of the organic phase into an organic solvent (S) phase and a PTMG phase. That is, it is not necessary to remove all of THF in the organic phase.

After removing THF, the resultant organic phase is introduced into third, separation vessel 9 so as to separate the organic phase into two liquid phases, namely, an organic solvent phase and a PTMG phase. Next, the organic solvent phase is removed from separation vessel 9 and the remaining PTMG phase is introduced into vacuum distillation vessel 10 (such as thin film distillation apparatus). In distillation vessel 10, low-boiling point substances (LBPS) (such as remaining THF, the organic solvent and THF oligomers) are distilled off, thereby obtaining the PTMG of the present invention.

By the above-mentioned method, it becomes possible to stably conduct a commercial scale production of the PTMG of the present invention which has an adjusted content of heteropolyacid and specific molecular weight distribution properties.

The PTMG of the present invention can be used in the form of a PTMG copolymer, i.e., a copolymer of THF with a monomer of another ether type polymer. Examples of the comonomer to be copolymerized with THF include 3-methyl-tetrahydrofuran, 1,2-propylene oxide, 3-methyloxetane and the like. In such a PTMG copolymer, the content of the comonomer units is 20% by weight or less, preferably 10% by weight or less, based on the weight of the PTMG copolymer.

The PTMG of the present invention exhibits improved properties with respect to heat resistance and low viscosity. By virtue of these excellent properties, not only can decomposition of the PTMG during the storage be suppressed, but also the amount of a stabilizer can be decreased. Further, thermal decomposition of PTMG being formed during the polymerization process is suppressed. Therefore, the PTMG of the present invention can be advantageously used for producing high performance elastic fibers, such as a polyester elastic fiber and a polyurethane elastic fiber.

BEST MODE FOR CARRYING OUT THE INVENTION

Hereinbelow, the present invention will be described in more detail with reference to the following Examples, Comparative Examples and Test Examples, but they should not be construed as limiting the scope of the present invention.

In the following Examples, various properties were measured using the following instruments and by the following methods.

(1) GPC
  i) Instruments
    GPC apparatus: Shodex GPC system-11 (manufactured and sold by Showa Denko K.K., Japan)
    Columns: Shodex OH pak (manufactured and sold by Showa Denko K. K., Japan):
      SB 806 M (2 columns)
      SB 802.5 (1 column).
  ii) Conditions Used for Analysis
  Detector: Differential refractometer
  Column temperature: 60° C.
  Carrier (eluent): 0.02 mol/liter LiBr solution of dimethylacetamide
  Flow rate of carrier: 1.0 ml/min
  Amount of injected sample: 100 $\mu$l
  Preparation of a sample: 0.8% solution of PTMG in the above-mentioned carrier.

(2) Viscosity
  i) Instruments
    Apparatuses: E-type viscometer, Controller E2 and Circulating constant-temperature bath VCH-4 (each manufactured and sold by TOKIMEC, Japan)
  ii) Conditions Used for Measuring Viscosity
  Temperature: 40° C. (39 to 41° C.)
  Revolution of rotor: 20 rpm (3) TGA (Thermogravimetric Analysis)
  i) Instrument
    Apparatus: TA 2950 (manufactured and sold by TA Instrument, U.S.A)
  ii) Conditions Used for Analysis
  Rate of increase in temperature: 10° C./min
  Range of temperature used for analysis:
    Room temperature to 500° C.
  Atmosphere used for analysis:
    Nitrogen gas atmosphere (purge time: 1 hour)

(4) Method for Determining a Heteropolyacid Content
Heteropolyacid content of PTMG is determined by measuring the concentrations of tungsten, molybdenum and vanadium contained in a heteropolyacid. The total of the tungsten, molybdenum and niobium concentrations is used as the heteropolyacid content of the PTMG.

A. Apparatus:
  PQ-type ICP-MS (manufactured and sold by VG Elemental, England)

B. Method for ICP-Mass Spectrometry:
① Approximately 5 g of a sample PTMG is placed in a quartz crucible.
② The crucible containing the sample is heated to calcine the sample, thereby obtaining a decomposition product.
③ To the decomposition product obtained in step ② above is added 2 ml of 35% hydrochloric acid solution. Then, the resultant mixture is heated on a hot plate to dissolve the decomposition product, thereby obtaining a solution.
④ 0.1 ml of an aqueous 1 ppm indium (In) solution is added to the obtained solution as an internal standard.
⑤ Water is added to the mixture obtained in step ④ above so that the final volume of the solution becomes 25 ml.
⑥ The solution obtained in step ⑤ is subjected to ICP-Mass spectrometry.

C. Preparation of a Calibration Curve:
① A set of standard solutions for preparing a calibration curve is individually prepared for each of tungsten, molybdenum and vanadium. Specifically, a series of solutions containing one metal specie in various concentrations (5 to 10000 ppb by weight) is prepared.
② 0.1 ml of an aqueous 1 ppm indium (In) solution as an internal standard is added to 5 g of each of the standard solutions prepared in step ①, thereby obtaining mixed solutions.
③ Water is added to the thus obtained solutions so that the volume of each solution becomes 25 ml.
④ The resultant solutions are subjected to ICP-Mass spectrometry so as to prepare a calibration curve.

D. Determination of a Heteropolyacid Content:
The concentrations of tungsten, molybdenum and vanadium of a sample PTMG is determined by using the calibration curves for tungsten, molybdenum and vanadium.

EXAMPLE 1

Figure 1:
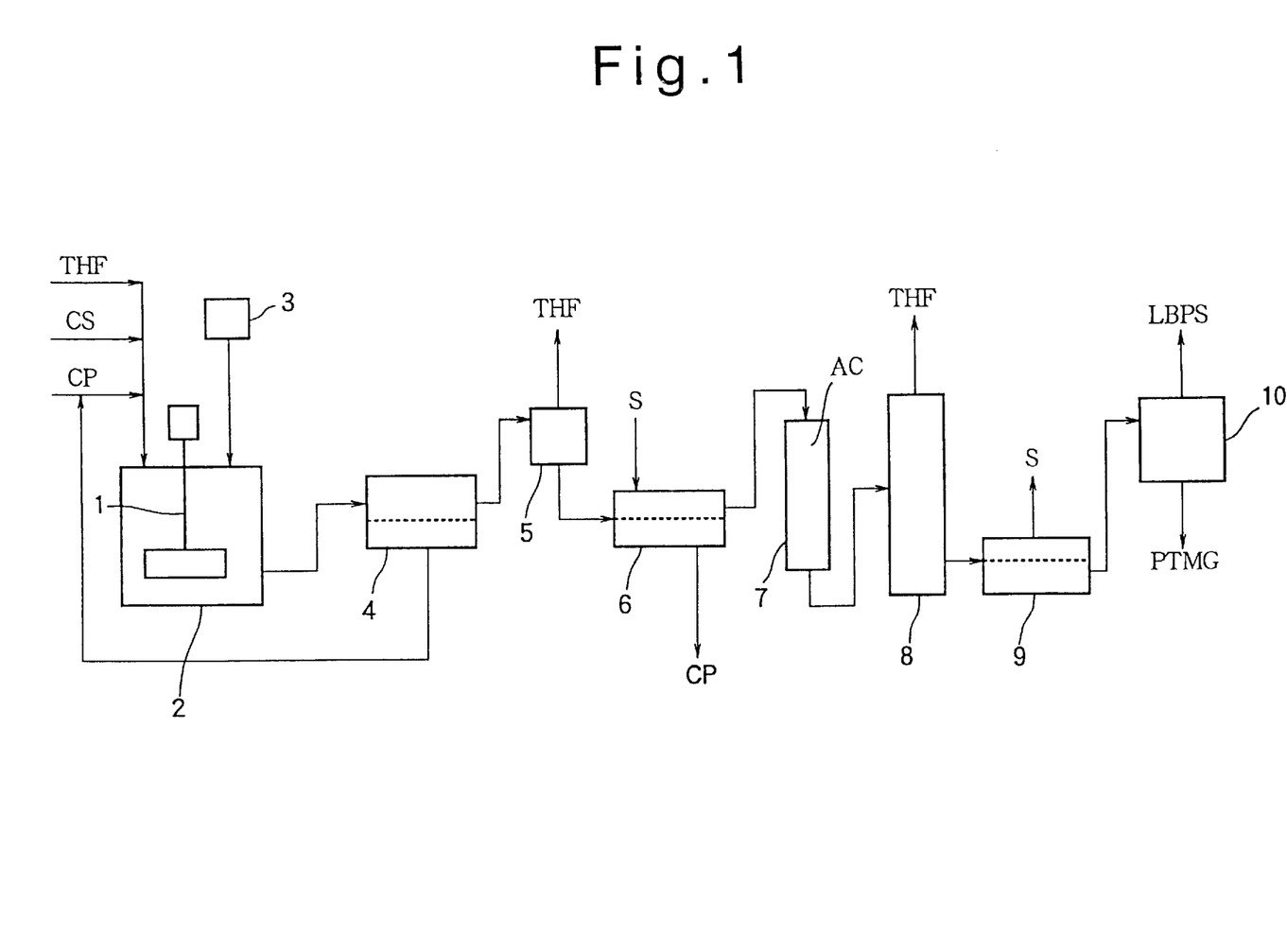
FIG. 1 is a schematic diagram showing the production system used for the PTMG of the present invention.

Polyoxytetramethylene glycol (PTMG) was produced using the production system shown in FIG. 1.

First, a heteropolyacid catalyst solution for use as a polymerization catalyst was produced as follows. A 2-liter reaction vessel was prepared, which is provided with a 3-way cock having three respective ends, wherein each end has attached thereto a condenser and an eggplant type flask for collecting and storing a distillate produced by the condenser, so that the contents of the reaction vessel can be distilled. The thus prepared reaction vessel was used for producing a heteropolyacid catalyst solution. 1 liter of tetrahydrofuran (THF) and 600 g of silicotungstic acid dodecahydrate were introduced into the reaction vessel in this order, and stirred at 60° C., while continuously removing an azeotropic vapor of water and THF from the reaction vessel. The specific gravity of a solution being formed in the reaction vessel was periodically measured while feeding THF to the reaction vessel every 10 minutes so as to compensate for the total amount of water and THF removed from the reaction vessel. When the specific gravity of the solution became 2.1, the reaction was terminated to thereby obtain a catalyst solution, namely, a solution of a heteropolyacid catalyst in a THF/water mixture.

Next, polyoxytetramethylene glycol was produced by the following operation. Reactor 2 having a capacity of 500 ml was equipped with stirrer 1 and a reflux condenser. 110 ml of the above-obtained catalyst solution (CS) was charged into reactor 2 and 310 ml of THF (monomer) was added thereto to thereby obtain a reaction system comprised of a THF organic phase and an aqueous THF/catalyst phase. The obtained reaction system was stirred at 60° C. while maintaining the motive power (P/V) applied to the liquid per unit volume of the reactor at 2.0 kW/m$^3$ and while feeding THF to reactor 2 at a rate of 28 ml/hour, to thereby obtain a polymerization reaction mixture comprising a reaction-formed THF organic phase containing a polyoxytetramethylene glycol and a reaction-formed aqueous THF/catalyst phase. The retention time (V/F) of THF in reactor 2 was 15 hours. During the reaction, water was fed to reactor 2 from water feeding tank 3 so as to maintain the specific gravity of the aqueous THF/catalyst phase at 2.1. A part of the polymerization reaction mixture was transferred into first, phase-separation vessel 4, thereby separating the reaction mixture into two phases, namely an upper reaction-formed THF organic phase containing a polyoxytetramethylene glycol and a lower reaction-formed aqueous THF/catalyst phase. The upper phase was withdrawn from first, phase-separation vessel 4 at a rate which is the same as the rate of the feeding of THF, while the lower reaction-formed aqueous THF/catalyst phase (CP) was recycled to reactor 2.

The upper phase withdrawn from first, phase-separation vessel 4 (i.e., the reaction-formed THF organic phase containing polyoxytetramethylene glycol) was fed into distillation vessel 5 for removing unreacted THF. The THF concentration of the organic phase was adjusted to 45 to 50% by weight, thereby obtaining a polyoxytetramethylene glycol concentrate.

The above-mentioned operation for obtaining a polyoxytetramethylene glycol was continuously performed for 50 hours. Approximately 10 g of the polyoxytetramethylene glycol concentrate produced during the stable operation of the reactor was sampled from distillation vessel 5 for GPC analysis. Specifically, low-boiling point substances were distilled off from the sampled polyoxytetramethylene glycol concentrate at 60° C. under 1 Torr before subjecting to GPC analysis. The results are shown in Table 4. Further, 100 g of the polyoxytetramethylene glycol concentrate produced during the stable operation of the reactor was subjected to the following operations for adjusting the heteropolyacid content of the polyoxytetramethylene glycol.

100 g of the polyoxytetramethylene glycol concentrate was fed into second, phase-separation vessel 6. 120 g of n-octane (solvent, S) was added to second, phase-separation vessel 6 and stirred for 5 minutes at room temperature, thereby obtaining a mixture. The obtained mixture was allowed to stand still for approximately 5 minutes, so that the mixture was separated into a lower aqueous THF/heteropolyacid catalyst phase (CP) and an upper organic phase. 200 g of the upper organic phase which is a solution containing polyoxytetramethylene glycol was placed in a 500 ml eggplant type flask which was warmed in a water bath maintained at 50° C. Subsequently, the solution was applied to adsorption column 7 at a rate of 100 g/hour using a pump. Adsorption column 7 was a column packed with 1 kg of an activated carbon (AC) and the column had an outer jacket in which water heated to 45° C. was circulated so as to maintain the inner temperature of adsorption column 7 at 40° C. or higher.

An eluate (approximately 200 g) obtained from adsorption column 7 was placed in a 300 ml eggplant type flask heated in an oil bath maintained at 100° C. The eggplant type flask was equipped with an Oldershaw distillation column (number of theoretical plates: 10). The eluate in the eggplant type flask was subjected to distillation under atmospheric pressure with stirring to thereby remove THF in the eluate. The residual solution in the flask was transferred to a 300 ml separation funnel used as third, phase-separation vessel 9. In third, phase-separation vessel 9, the solution was allowed to separate into two phases, namely a phase containing polyoxytetramethylene glycol as a main component and a phase containing n-octane (S) as a main component. The lower phase (approximately 30 g) containing polyoxytetramethylene glycol was taken out from third, phase-separation vessel 9 and subjected to vacuum distillation in vacuum distillation vessel 10 for 20 minutes at 100° C. under a reduced pressure of not more than 0.1 Torr. Low-boiling point substances (LBPS), such as n-octane, THF and oligomers, were distilled off to thereby obtain PTMG. The obtained PTMG was approximately 23 g.

The number average molecular weight (Mn) and the molecular weight distribution (Mw/Mn) of the obtained PTMG was determined by GPC under the conditions mentioned in item (1) above. The results are shown in Table 4. The heteropolyacid (silicotungstic acid) content of the obtained PTMG was determined by the method described in item (4) above. The heteropolyacid content of the PTMG was 300 ppb by weight.

EXAMPLE 2

PTMG having a narrower molecular weight distribution than that of the PTMG produced in Example 1 was produced in the following manner. The operation for producing polyoxytetramethylene glycol was effected in the same manner as in Example 1, except that the amount of the silicotungstic acid solution (catalyst solution) charged into the reactor was increased by 50 ml without changing the total volume of the liquid in reactor 2 (thus, the amount of THF charged into the reactor was decreased to 260 ml) and the feeding rate of THF was 42 ml/hour. In addition, the V/F value of THF in the reactor was changed from 15 hours to 10 hours. The P/V value of the reactor was 2.0 kW/m$^3$ which was the same as that of Example 1.

With respect to the produced polyoxytetramethylene glycol, the number average molecular weight was 1940; the molecular weight distribution was 1.65; and the content of high molecular weight PTMG molecules was 2.98% by weight. From these values it is understood that the molecular weight distribution of a polyoxytetramethylene glycol can be narrowed without changing the number average molecular weight thereof, by decreasing the V/F value of THF in the reactor.

The heteropolyacid (silicotungstic acid) content of the produced polyoxytetramethylene glycol was adjusted in the same manner as in Example 1, thereby obtaining PTMG. The heteropolyacid content of the PTMG was 230 ppb by weight. Further, the PTMG obtained by adjusting the heteropolyacid content of the polyoxytetramethylene glycol was analyzed by GPC. The results are shown in Table 4.

EXAMPLE 3

The operation for producing polyoxytetramethylene glycol was effected in substantially the same manner as in Example 1, except that 80 ml of a phosphomolybdic acid solution having a specific gravity of 1.8 was used as a catalyst solution, the initial amount of THF charged in the reactor was 340 ml, the V/F value of THF in the reactor was 10 hours, and the feeding rate of water was controlled so as to maintain the specific gravity of the aqueous THF/catalyst phase in the reactor at 1.8. In addition, the P/V value was 2.3 kW/m$^3$.

With respect to the produced polyoxytetramethylene glycol, the number average molecular weight was 1060; the molecular weight distribution was 1.70; and the content of high molecular weight PTMG molecules was 4.35% by weight.

The heteropolyacid (phosphomolybdic acid) content of the produced polyoxytetramethylene glycol was adjusted in the same manner as in Example 1, thereby obtaining PTMG. The heteropolyacid content of the PTMG was 600 ppb by weight. Further, the PTMG obtained by adjusting the heteropolyacid content of the polyoxytetramethylene glycol was analyzed by GPC. The results are shown in Table 4.

EXAMPLE 4

PTMG having a broader molecular weight distribution than that of the PTMG produced in Example 3 was produced in the following manner. The operation for producing polyoxytetramethylene glycol was effected in substantially the same manner as in Example 3, except that the volume of the catalyst phase in the reactor was 60 ml, the volume of the THF organic phase was 360 ml, and the V/F value of THF in the reactor was 13 hours. With respect to the produced polyoxytetramethylene glycol, the number average molecular weight as 1055; the molecular weight distribution was 1.8; and the content of high molecular weight PTMG molecules was 4.94% by weight.

The heteropolyacid content of the produced polyoxytetramethylene glycol was adjusted in the same manner as in Example 1, thereby obtaining PTMG. The heteropolyacid content of the PTMG was 690 ppb by weight. Further, the PTMG obtained by adjusting the heteropolyacid content of the polyoxytetramethylene glycol was analyzed by GPC. The results are shown in Table 4.

EXAMPLE 5

The operation for producing polyoxytetramethylene glycol was effected in substantially the same manner as in Example 3, except that 200 ml of a phosphomolybdic acid solution having a specific gravity of 1.8 was used as a catalyst solution, the volume of the THF organic phase in the reactor was 220 ml, the V/F value of THF in the reactor was 10 hours, and the P/V value of the reactor was 2.2 kW/m$^3$. With respect to the produced polyoxytetramethylene glycol, the number average molecular weight was 1300; the molecular weight distribution was 1.7; and the content of high molecular weight PTMG molecules was 3.98% by weight.

The heteropolyacid content of the produced polyoxytetramethylene glycol was adjusted in the same manner as in Example 1, thereby obtaining PTMG. The heteropolyacid content of the PTMG was 450 ppb by weight. Further, the PTMG obtained by adjusting the heteropolyacid content of the polyoxytetramethylene glycol was analyzed by GPC. The results are shown in Table 4.

COMPARATIVE EXAMPLE 1

A polyoxytetramethylene glycol having a broader molecular weight distribution than that of the PTMG produced in Example 4 was produced in the following manner. The operation for producing a polyoxytetramethylene glycol was effected in substantially the same manner as in Example 4, except that the P/V value was decreased to 1.2 kW/m$^3$. With respect to the produced polyoxytetramethylene glycol, the number average molecular weight was 1295; the molecular weight distribution was 1.85; and the content of high molecular weight polyoxytetramethylene glycol molecules was 4.8% by weight.

The heteropolyacid content of the produced polyoxytetramethylene glycol was adjusted in the same manner as in Example 1. The heteropolyacid content of the resultant polyoxytetramethylene glycol was 590 ppb by weight. Further, the polyoxytetramethylene glycol after the adjustment of the heteropolyacid content was analyzed by GPC. The results are shown in Table 4.

EXAMPLES 6 TO 10 AND COMPARATIVE EXAMPLE 2

THF was polymerized using a phosphotungstic acid solution having a specific gravity of 2.07 as a catalyst solution. Specifically, the operation for producing polyoxytetramethylene glycol was effected in substantially the same manner as in Example 1, except that the reaction conditions shown in Tables 2 and 3 were employed. In addition, the volume (V) of the liquid in the reactor was maintained at 420 ml and the feeding rate of water was controlled so as to maintain the specific gravity of the aqueous THF/catalyst phase at 2.07.

In order to elucidate the correlation between the molecular weight distribution and the V/F value of THF in the reactor, in Examples 6 to 8, polyoxytetramethylene glycols were produced under the reaction conditions where the P/V value was fixed at 1.95 kW/m$^3$. With respect to other reaction conditions, the conditions shown in Table 2 were employed. The number average molecular weights and the molecular weight distributions of the produced polyoxytetramethylene glycols were determined by GPC. The results are shown in Table 2.

The heteropolyacid (phosphotungstic acid) contents of the produced polyoxytetramethylene glycols were adjusted in the same manner as in Example 1, thereby obtaining PTMG's. The heteropolyacid contents of the PTMG's obtained in Examples 6 to 8 were 260 ppb, 310 ppb and 220 ppb by weight, respectively. Further, each PTMG obtained by adjusting the heteropolyacid content of the polyoxytetramethylene glycol was analyzed by GPC. The results are shown in Table 5.

TABLE 2

| Reaction conditions | Heteropolyacid | Volume of the liquid in the reactor: V (ml) | Feeding rate of THF: F (ml/Hr) | V/F (Hr) | Volume of the catalyst phase (ml) | Mn | Mw/Mn |
|---|---|---|---|---|---|---|---|
| Ex. 6 | Phosphotungstic acid | 420 | 64 | 6.6 | 180 | 1810 | 1.60 |
| Ex. 7 | Phosphotungstic acid | 420 | 42 | 10 | 120 | 1800 | 1.69 |
| Ex. 8 | Phosphotungstic acid | 420 | 28 | 15 | 80 | 1805 | 1.79 |

FIG. 2 is a chromatogram of the PTMG produced in Example 6 (PTMG obtained by adjusting the heteropolyacid content of the polyoxytetramethylene glycol) which shows the molecular weight distribution of the PTMG.

In FIG. 2, the abscissa shows the logarithm (log) of the molecular weight; the ordinate shows the weight % of component PTMG molecule, based on the total weight of all PTMG molecules; and the intersection of the vertical straight broken line and the abscissa shows the logarithm of the number average molecular weight. The area of a hatched portion shows the amount of the PTMG molecules having molecular weights (10860 or more; log (molecular weight)= 4.04 or more), which are at least six times as large as the number average molecular weight (Mn=1810; log Mn=3.26) of all PTMG molecules. The ratio of the area of the hatched portion to the total area of the peak is 2.29%.

Next, in order to elucidate the correlation between the molecular weight distribution and the P/V value applied to the liquid in the reactor, in Comparative Example 2 and Examples 9 and 10, polyoxytetramethylene glycols were produced under the reaction conditions in which the V/F value and the volume of the catalyst phase were fixed at 9 hours and 133.3 ml, respectively. With respect to other reaction conditions, the conditions shown in Table 3 were employed. The number average molecular weight and the molecular weight distribution of the produced polyoxytetramethylene glycols were determined. The results are shown in Table 3.

The heteropolyacid contents of the produced polyoxytetramethylene glycols were adjusted in the same manner as in Example 1. The heteropolyacid contents of the resultant polyoxytetramethylene glycols produced in Comparative Example 2 and Examples 9 and 10 were 330 ppb, 280 ppb and 270 ppb by weight, respectively. Further, the polyoxytetramethylene glycols obtained after adjusting the heteropolyacid contents were analyzed by GPC. The results are shown in Table 5.

The following formulae (5) and (6) showing the correlation between the molecular weight distribution (Mw/Mn) and the retention time (V/F) of THF and the motive power (P/V) applied to the liquid per unit volume of the reactor were obtained from the results shown in Tables 2 and 3.

$$Mw/Mn = 1.24 \times (V/F)^{0.134} \tag{5}$$

$$Mw/Mn = 1.95 \times (P/V)^{-0.210} \tag{6}$$

EXAMPLE 11

The operation for producing polyoxytetramethylene glycol was effected in substantially the same manner as in Example 2, except that 180 ml of a phosphotungstic acid solution having a specific gravity of 1.80 was used as a catalyst solution, the feeding rate of THF was 100 ml/hour, the V/F value of THF in the reactor was 4.2 hours, the P/V value of the reactor was 2.1 kW/m³, and the volume of the THF organic phase was 240 ml. With respect to the produced polyoxytetramethylene glycol, the number average molecular weight was 852; the molecular weight distribution was 1.68; and the content of high molecular weight PTMG molecules was 4.35% by weight.

Further, the heteropolyacid content of the produced polyoxytetramethylene glycol was adjusted in the same manner as in Example 1, thereby obtaining PTMG. The heteropolyacid content of the PTMG was 590 ppb by weight. Further, the PTMG obtained by adjusting the heteropolyacid content of the polyoxytetramethylene glycol was analyzed by GPC. The results are shown in Table 5.

The viscosity of PTMG produced in each of Examples 1 to 11 and Comparative Examples 1 and 2 was determined by E-type viscometer under the conditions mentioned in item (2) above. The viscosities of the PTMG's are shown in Tables 4 and 5 together with other characteristics.

TABLE 3

| Reaction conditions | Heteropolyacid | Volume of the liquid in the reactor: V (ml) | Motive power applied to the liquid in the reactor P (mW) | P/V (kW/m³) | Mn | Mw/Mn |
|---|---|---|---|---|---|---|
| Comp Ex. 2 | Phosphotungstic acid | 420 | 462 | 1.1 | 1800 | 1.91 |
| Ex. 9 | Phosphotungstic acid | 420 | 756 | 1.8 | 1800 | 1.71 |
| Ex. 10 | Phosphotungstic acid | 420 | 1092 | 2.6 | 1805 | 1.62 |

TABLE 4

| Catalyst | Ex. 1 Silicotungstic acid | Ex. 2 Silicotungstic acid | Ex. 3 | Ex. 4 Phosphomolybdic acid | Ex. 5 Phosphomolybdic acid | Comp. Ex. 1 |
|---|---|---|---|---|---|---|
| Specific gravity of the catalyst solution | 2.1 | 2.1 | 1.8 | 1.8 | 1.8 | 1.8 |
| Volume of the liquid in the reactor: V (ml) | 420 | 420 | 420 | 420 | 420 | 420 |
| Volume of the catalyst phase (ml) | 110 | 160 | 80 | 60 | 200 | 200 |
| Volume of the THF organic phase (ml) | 310 | 260 | 340 | 360 | 220 | 220 |
| Reaction temperature (° C.) | 60 | 60 | 60 | 60 | 60 | 60 |
| Feeding rate of THF: F (ml/Hr) | 28 | 42 | 42 | 32.3 | 42 | 42 |
| V/F (Hr) | 15 | 10 | 10 | 13 | 10 | 10 |
| P/V (kW/m³) | 2 | 2 | 2.3 | 2.3 | 2.2 | 1.2 |
| Before adjustment of heteropolyacid content | | | | | | |
| Mn | 1940 | 1940 | 1060 | 1055 | 1300 | 1295 |
| Mw/Mn | 1.8 | 1.65 | 1.7 | 1.8 | 1.7 | 1.85 |
| Content of high molecular weight PTMG molecules*) (% by weight) | 4.1 | 2.98 | 4.35 | 4.94 | 3.98 | 4.8 |
| After adjustment of heteropolyacid content | | | | | | |
| Heteropolyacid content (ppb by weight) | 300 | 230 | 600 | 690 | 450 | 590 |
| Viscosity (cP) | 836 | 725 | 332 | 356 | 451 | 510 |
| Mn | 1960 | 1950 | 1070 | 1060 | 1310 | 1300 |
| Mw/Mn | 1.79 | 1.65 | 1.7 | 1.8 | 1.68 | 1.85 |
| Content of high molecular weight PTMG molecules*) (% by weight) | 4.0 | 2.90 | 4.36 | 4.95 | 3.80 | 4.85 |

TABLE 4-continued

| Catalyst | Ex. 1 | Ex. 2 | Ex. 3 | Ex. 4 | Ex. 5 | Comp. Ex. 1 |
|---|---|---|---|---|---|---|
| | Silicotungstic acid | | | Phosphomolybdic acid | | |

*⁾High molecular weight PTMG molecules are defined as PTMG molecules having molecular weights which are at least six times as large as the number average molecular weight of all PTMG molecules.

TABLE 5

| Catalyst | Ex. 6 | Ex. 7 | Ex. 8 | Comp. Ex. 2 | Ex. 9 | Ex. 10 | Ex. 11 |
|---|---|---|---|---|---|---|---|
| | | | | Phosphotungstic acid | | | |
| Specific gravity of the catalyst solution | 2.07 | 2.07 | 2.07 | 2.07 | 2.07 | 2.07 | 1.80 |
| Volume of the liquid in the reactor: V (ml) | 420 | 420 | 420 | 420 | 420 | 420 | 420 |
| Volume of the catalyst phase (ml) | 180 | 120 | 80 | 133.3 | 133.3 | 133.3 | 180 |
| Volume of the THF organic phase (ml) | 240 | 300 | 340 | 286.7 | 286.7 | 286.7 | 240 |
| Reaction temperature (° C.) | 60 | 60 | 60 | 60 | 60 | 60 | 60 |
| Feeding rate of THF: F (ml/Hr) | 64 | 42 | 28 | 28 | 46.7 | 46.7 | 100 |
| V/F (Hr) | 6.5625 | 10 | 15 | 9 | 9 | 9 | 4.2 |
| P/V (kW/m$^3$) | 1.95 | 1.95 | 1.95 | 1.1 | 1.8 | 2.6 | 2.1 |
| Before adjustment of heteropolyacid content | | | | | | | |
| Mn | 1810 | 1800 | 1805 | 1800 | 1800 | 1805 | 852 |
| Mw/Mn | 1.6 | 1.69 | 1.79 | 1.91 | 1.71 | 1.62 | 1.68 |
| Content of high molecular weight PTMG molecules*⁾ (% by weight) | 2.29 | 3.05 | 3.89 | 4.73 | 3.24 | 2.89 | 4.35 |
| After adjustment of heteropolyacid content | | | | | | | |
| Heteropolyacid content (ppb by weight) | 270 | 310 | 220 | 330 | 280 | 270 | 590 |
| Viscosity (cP) | 638 | 698 | 761 | 838 | 695 | 638 | 242 |
| Mn | 1800 | 1810 | 1820 | 1800 | 1795 | 1820 | 856 |
| Mw/Mn | 1.6 | 1.68 | 1.78 | 1.90 | 1.7 | 1.60 | 1.66 |
| Content of high molecular weight PTMG molecules*⁾ (% by weight) | 2.28 | 3.00 | 3.80 | 4.81 | 3.19 | 2.70 | 4.45 |

*⁾High molecular weight PTMG molecules are defined as PTMG molecules having molecular weights which are at least six times as large as the number average molecular weight of all PTMG molecules.

EXAMPLE 12

Using the reaction conditions of Example 6, a polymerization operation was continuously performed for 50 hours, thereby obtaining 1.25 kg of a polyoxytetramethylene glycol concentrate in which a THF concentration has been adjusted to 45 to 50% by weight. The polyoxytetramethylene glycol concentrate was subjected to vacuum distillation in a vacuum distillation vessel at 60° C. under a reduced pressure of not more than 1 Torr to distill off low-boiling point substances (such as THF), thereby obtaining polyoxytetramethylene glycol. With respect to the obtained polyoxytetramethylene glycol, the number average molecular weight was 1810; the molecular weight distribution was 1.6; and the content of high molecular weight polyoxytetramethylene glycol molecules (the molecules having molecular weights which are at least six times as large as the number average molecular weight of all polyoxytetramethylene glycol molecules) was 2.29% by weight. The polyoxytetramethylene glycol was subjected to the following operations for adjusting the content of the residual heteropolyacid catalyst.

To 550 g of the polyoxytetramethylene glycol were added 400 g of THF, 2 g of water and 1500 g of n-octane, and the resultant mixture was stirred vigorously for 10 minutes at room temperature. Subsequently, the mixture was allowed to stand still for 1 hour to thereby separate the mixture into a lower catalyst phase containing phosphotungstic acid and upper organic phases. After eliminating the lowermost catalyst phase, the organic phases (containing polyoxytetramethylene glycol, THF, water and n-octane) were transferred to a vessel and 80 g of an activated carbon was added thereto, followed by stirring at 40° C. for 15 minutes. The activated carbon was removed by filtration using a membrane filter, thereby obtaining 2420 g of a solution containing 530 g of polyoxytetramethylene glycol, 390 g of THF and 1500 g of n-octane.

Half the amount (i.e., 1210 g) of the obtained solution was heated in an oil bath maintained at 100° C. to thereby distill off a part of THF contained in the solution. Next, the solution was allowed to stand still to thereby separate the solution into two phases, namely a polyoxytetramethylene glycol phase and an n-octane phase, and the upper n-octane phase was eliminated. The remaining lower polyoxytetramethylene glycol phase was subjected to distillation at 60° C. under 1 Torr. The low-boiling point substances (such as THF and n-octane) were distilled off to thereby obtain 256 g of PTMG.

With respect to the obtained PTMG, the number average molecular weight was 1800; the molecular weight distribution was 1.6; and the content of high molecular weight PTMG molecules (the molecules having molecular weights which are at least six times as large as the number average molecular weight of all PTMG molecules) was 2.28% by weight. The heteropolyacid content of the PTMG was 270 ppb.

EXAMPLE 13

Using the reaction conditions of Example 11, a polymerization operation was continuously performed for 150 hours, thereby obtaining 1.2 kg of polyoxytetramethylene glycol concentrate in which a THF concentration has been adjusted to 45 to 50%. The polyoxytetramethylene glycol concentrate was subjected to vacuum distillation in a vacuum distillation vessel at 60° C. under a reduced pressure of not more than 1 Torr to distill off low-boiling point substances (such as THF), thereby obtaining polyoxytetramethylene glycol. With respect to the obtained polyoxytetramethylene glycol, the number average molecular weight was 852; the molecular weight distribution was 1.68; and the content of high molecular weight polyoxytetramethylene glycol molecules (the molecules having molecular weights which are at least six times as large as the number average molecular weight of all polyoxytetramethylene glycol molecules) was 4.35% by weight.

The heteropolyacid content of the polyoxytetramethylene glycol was adjusted in the same manner as in Example 12, thereby obtaining PTMG.

shown in Table 6 together with the viscosity of sample polyoxytetramethylene glycols.

Sample polyoxytetramethylene glycol used in Test Example 1 was PTMG produced in Example 13 and sample polyoxytetramethylene glycol used in Test Example 2 was PTMG produced in Example 12. Sample polyoxytetramethylene glycols used in Test Examples 3 and 4 were manufactured and sold by BASF AG, Germany; sample polyoxytetramethylene glycols used in Test Examples 5 and 6 were manufactured and sold by Du Pont, USA; sample polyoxytetramethylene glycols used in Test Examples 7 to 9 were manufactured and sold by Hodogaya Chemical Co., Ltd., Japan; and sample polyoxytetramethylene glycols used in Test Examples 10 and 11 were manufactured and sold by Mitsubishi Chemical Corporation, Japan.

TABLE 6

Heat resistance and viscosity of various PTMG's

| | Test Example 1 | Test Example 2 | Test Example 3 | Test Example 4 | Test Example 5 | Test Example 6 | Test Example 7 | Test Example 8 | Test Example 9 | Test Example 10 | Test Example 11 |
|---|---|---|---|---|---|---|---|---|---|---|---|
| Mn (determined by GPC) | 856 | 1800 | 891 | 1787 | 922 | 1826 | 596 | 898 | 1846 | 931 | 1744 |
| Mw/Mn (determined by GPC) | 1.66 | 1.60 | 1.87 | 2.44 | 1.89 | 2.47 | 1.45 | 1.78 | 2.51 | 2.07 | 2.53 |
| Content of high molecular weight PTMG molecules (% by weight) | 4.45 | 2.28 | 5.21 | 10.85 | 5.81 | 11.62 | 1.47 | 3.78 | 13.39 | 7.01 | 13.39 |
| Heteropolyacid content (ppb by weight) | 590 | 270 | 80 | 22 | 0 | 0 | 27 | 7 | 0 | 0 | 0 |
| Heat resistance (5 wt % reduction temperature) (° C.) | 281.5 | 289.9 | 255.7 | 275.8 | 273.4 | 244.0 | 244.9 | 267.2 | 275.2 | 251.7 | 268.0 |
| Viscosity (E-type viscometer) (cP) | 242 | 630 | 287 | 1175 | 292 | 1257 | 138 | 269 | 1345 | 327 | 1182 |

With respect to the obtained PTMG, the number average molecular weight was 856; the molecular weight distribution was 1.66; and the content of high molecular weight PTMG having molecular weights which are at least six times as large as the number average molecular weight was 4.45% by weight. The heteropolyacid content of PTMG was 590 ppb. (Heat Resistance Test of PTMG)

TEST EXAMPLE 1 TO 11

Various sample polyoxytetramethylene glycols having different number average molecular weights, molecular weight distributions, different contents of high molecular weight PTMG molecules (the molecules having molecular weights which are at least six times as large as the number average molecular weight of all PTMG molecules), and different heteropolyacid contents, were subjected to TGA analysis under nitrogen atmosphere, to thereby determine the temperatures at which the weights of sample polyoxytetramethylene glycols were reduced by 5% (i.e., 5 wt % reduction temperature). The results of the TGA analysis are As apparent from Table 6 above, the PTMG's of the present invention (Test Examples 1 and 2) which have not only a molecular weight distribution of 1.8 or less and a content of high molecular weight PTMG molecules (PTMG molecules having molecular weights which are at least six times as large as the number average molecular weight of all PTMG molecules) of 2 to 5% by weight, but also a heteropolyacid content of from 10 to 900 ppb by weight, exhibit higher heat resistance than the conventional polyoxytetramethylene glycols used in Test Examples 3 to 11 which do not satisfy all of the characteristics required for the present invention.

TEST EXAMPLES 12 TO 14

Three sample polyoxytetramethylene glycols having different number average molecular weights, different molecular weight distributions, different contents of high molecular weight PTMG molecules and different heteropolyacid contents were subjected to heat resistance test at 120° C.

Each of sample polyoxytetramethylene glycols shown in Table 7 was tested as follows. 60 g of a polyoxytetramethylene glycol was placed in an autoclave equipped with a pressure gauge. After replacing air inside the autoclave with nitrogen gas, the autoclave was placed in an oil bath maintained at 120° C. for 13 hours. Then, the pressure inside the autoclave was determined by reading the pressure gauge. The autoclave was cooled to room temperature. Deterioration of sample polyoxytetramethylene glycol after the heat resistance test was detected by evaluating its chromaticity, appearance (i.e., evaluation with naked eye), and the number average molecular weight as measured by GPC. The results are shown in Table 7.

TABLE 7

|  | Test Example 12 | Test Example 13 | Test Example 14 |
|---|---|---|---|
| Mn | 1800 | 1800 | 1800 |
| Mw/Mn | 1.60 | 1.60 | 1.74 |
| Content of high molecular weight PTMG molecules (% by weight) | 2.28 | 2.28 | 8.32 |
| Heteropolyacid content (ppb by weight) | 270 | 2880 | 200 |
| Results of heat resistance test | | | |
| Internal pressure (kg/cm$^2$.G) | 0.22 | 0.32 | 0.30 |
| Chromaticity (APHA) | <10 | 30 | 20 |
| Evaluation with naked eye | No change | Black substances were floating in the PTMG | No change |
| Mn after the heat resistance test | 1760 | 1700 | 1820 |

From Table 7 it is understood that, in Test Example 12 which used the PTMG produced in Example 6, both the increase in the inner pressure and the change in the number average molecular weight of the PTMG after the heat resistance test were small because only a small amount of low-boiling point substances were generated by the decomposition of the PTMG. The results of Test Example 12 are excellent over the results of Test Example 13 (which used a polyoxytetramethylene glycol having a heteropolyacid content of more than 900 ppb by weight) and Test Example 14 (which used a polyoxytetramethylene glycol having a content of high molecular weight PTMG molecules of more than 5% by weight).

INDUSTRIAL APPLICABILITY

The polyoxytetramethylene glycol (PTMG) of the present invention, which has a number average molecular weight of from 500 to 3000, a molecular weight distribution (Mw/Mn) of 1.8 or less, a content of high molecular weight PTMG molecules of from 2 to 5% by weight, wherein the high molecular weight PTMG molecules are defined as PTMG molecules having molecular weights which are at least six times as large as the number average molecular weight of all PTMG molecules, and a heteropolyacid content of from 10 to 900 ppb by weight, exhibits improved properties with respect to heat resistance and low viscosity. By virtue of these improved properties, not only can decomposition of the PTMG during the storage be suppressed, but also occurrence of the thermal decomposition during the polymerization for producing the PTMG can be suppressed. Therefore, the PTMG of the present invention can be advantageously used for producing a high performance elastic fiber, such as a polyurethane urea elastic fiber having excellent physical and chemical properties, a polyurethane elastic fiber and a polyester elastic fiber.

What is claimed is:

1. A polyoxytetramethylene glycol (PTMG) having the following characteristics:
   (1) a number average molecular weight of from 500 to 3000;
   (2) a molecular weight distribution of 1.8 or less in terms of the Mw/Mn ratio, wherein Mw represents the weight average molecular weight of PTMG and Mn represents the number average molecular weight of PTMG;
   (3) a content of high molecular weight PTMG molecules of from 2 to 5% by weight, based on the total weight of all PTMG molecules, wherein said high molecular weight PTMG molecules are defined as PTMG molecules having molecular weights which are at least six times as large as the number average molecular weight of all PTMG molecules; and
   (4) a heteropolyacid content of from 10 to 900 ppb by weight.

2. The polyoxytetramethylene glycol according to claim 1, which has a molecular weight distribution of 1.7 or less.

3. The polyoxytetramethylene glycol according to claim 1, which has a content of high molecular weight PTMG molecules of 2.0 to 3.5% by weight, based on the total weight of all PTMG molecules.

4. The polyoxytetramethylene glycol according to claim 1, which has a heteropolyacid content of 30 to 800 ppb by weight.

5. A method for producing the polyoxytetramethylene glycol (PTMG) of claim 1, which comprises subjecting tetrahydrofuran to a polymerization reaction in a continuous polymerization reactor with a stirrer in the presence of a heteropolyacid catalyst, while feeding tetrahydrofuran to the continuous polymerization reactor, said polymerization reaction being continuously performed in the presence of water, wherein said water is present in an amount sufficient to form a tetrahydrofuran organic phase and an aqueous tetrahydrofuran/catalyst phase which comprises a solution of the heteropolyacid catalyst in a tetrahydrofuran/water mixture and which has a specific gravity of from 1.8 to 2.3, while maintaining a V/F value at 0.5 to 20 hours wherein V represents the volume (m$^3$) of the liquid in said reactor and F represents the rate (m$^3$/hour) of feeding tetrahydrofuran to said reactor so that the V/F value represents the retention time (hour or hours) of tetrahydrofuran in said reactor and while maintaining a P/V value at 1.3 kW or more.wherein P represents the motive power (kW) applied to the liquid in said reactor and V is as defined above so that the P/V value represents the motive power (kW/m$^3$) applied to the liquid per unit volume thereof, to thereby obtain a polymerization reaction mixture comprising a reaction-formed tetrahydrofuran organic phase containing a polyoxytetramethylene glycol having a number average molecular weight of from 500 to 3,000 and a reaction-formed aqueous tetrahydrofuran/catalyst phase, separating said reaction-formed tetrahydrofuran organic phase containing said polyoxytetramethylene glycol from said polymerization reaction mixture, and adjusting the heteropolyacid content of said polyoxytetramethylene glycol to a level of 10 to 900 ppb by weight.

* * * * *